(12) United States Patent
Isokawa et al.

(10) Patent No.: US 8,995,079 B2
(45) Date of Patent: Mar. 31, 2015

(54) MAGNETIC HEAD, MAGNETIC DISK DRIVE, AND METHOD OF CONTROLLING MAGNETIC HEAD

(71) Applicant: Kabushiki Kaisha Toshiba, Tokyo (JP)

(72) Inventors: Hiroshi Isokawa, Kanagawa (JP); Tomoko Taguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/023,956

(22) Filed: Sep. 11, 2013

(65) Prior Publication Data
US 2015/0003219 A1   Jan. 1, 2015

(30) Foreign Application Priority Data
Jun. 26, 2013  (JP) .................................. 2013-133896

(51) Int. Cl.
| | |
|---|---|
| *G11B 5/02* | (2006.01) |
| *G11B 33/14* | (2006.01) |
| *G11B 13/04* | (2006.01) |
| *G11B 5/48* | (2006.01) |

(52) U.S. Cl.
CPC .............. *G11B 33/144* (2013.01); *G11B 13/04* (2013.01); *G11B 5/4866* (2013.01)
USPC ......................................................... 360/59

(58) Field of Classification Search
None
See application file for complete search history.

(56) References Cited

U.S. PATENT DOCUMENTS

| | | | |
|---|---|---|---|
| 8,526,275 B1 * | 9/2013 | Yuan et al. ................. | 369/13.33 |
| 8,605,555 B1 * | 12/2013 | Chernyshov et al. ...... | 369/13.33 |
| 2009/0073597 A1 | 3/2009 | Shiramatsu et al. | |
| 2010/0002330 A1 | 1/2010 | Lille | |
| 2010/0061200 A1 * | 3/2010 | Shimazawa et al. ....... | 369/13.33 |
| 2011/0090770 A1 | 4/2011 | Iwanabe et al. | |
| 2011/0128828 A1 | 6/2011 | Naniwa et al. | |
| 2011/0299367 A1 * | 12/2011 | Naniwa et al. ............. | 369/13.33 |
| 2012/0008233 A1 * | 1/2012 | Hirano et al. .................. | 360/75 |
| 2012/0050906 A1 * | 3/2012 | Balamane et al. .............. | 360/59 |
| 2012/0075966 A1 | 3/2012 | Tomikawa et al. | |
| 2012/0163139 A1 * | 6/2012 | Vavra et al. ................ | 369/13.33 |
| 2013/0107679 A1 * | 5/2013 | Huang et al. ............... | 369/13.32 |

FOREIGN PATENT DOCUMENTS

JP       2011-118973       6/2011

\* cited by examiner

*Primary Examiner* — Peter Vincent Agustin
(74) *Attorney, Agent, or Firm* — Knobbe Martens Olson & Bear LLP

(57) ABSTRACT

According to one embodiment, there is provided a magnetic head including a wave guide, a near field transducer, a writing magnetic pole, a magnetic core, a writing coil, and a first temperature control element. The near field transducer is disposed on an ABS surface and to which light is guided from the wave guide. The writing magnetic pole is disposed on the ABS surface. The magnetic core is connected to the writing magnetic pole so as to generate a magnetic field from a portion of the writing magnetic pole close to the ABS surface. The writing coil is disposed so as to go around the magnetic core. The first temperature control element is disposed in contact with a region of a first side surface of the wave guide near the near field transducer.

18 Claims, 17 Drawing Sheets

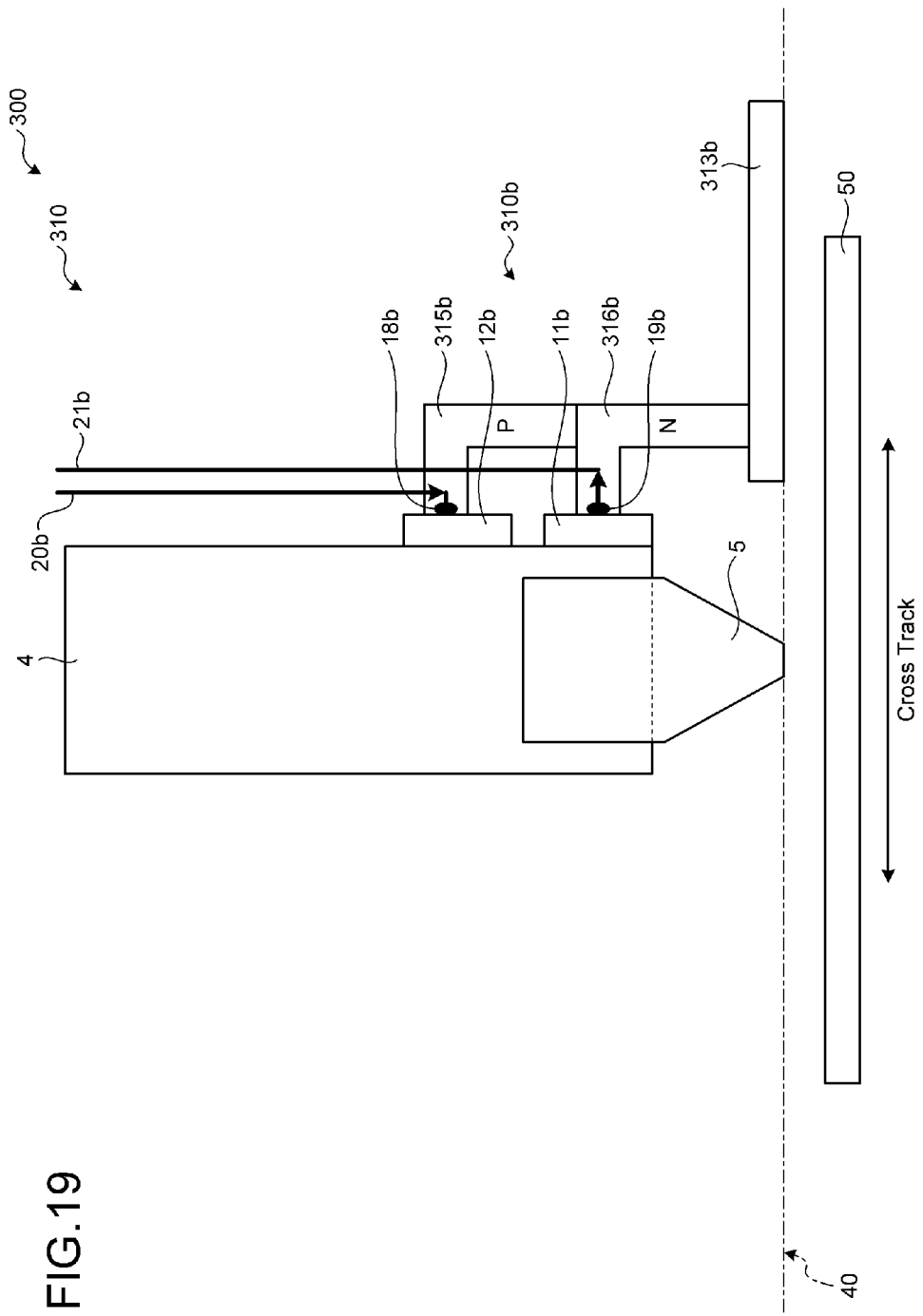

MAGNETIC HEAD, MAGNETIC DISK DRIVE, AND METHOD OF CONTROLLING MAGNETIC HEAD

CROSS-REFERENCE TO RELATED APPLICATIONS

This application is based upon and claims the benefit of priority from Japanese Patent Application No. 2013-133896, filed on Jun. 26, 2013; the entire contents of which are incorporated herein by reference.

FIELD

Embodiments described herein relate generally to a magnetic head, a magnetic disk drive, and a method of controlling a magnetic head.

BACKGROUND

In recent years, a heat-assisted recording method has been attracting an attention as a technique for allowing high-density magnetic recording of 1 Tbit/inch$^2$ class. In the heat-assisted writing method, a part of the surface of a magnetic disk is irradiated with near-field light converted from laser light by a near field transducer, so that the temperature of the magnetic disk rises locally. Further, a magnetic field is applied to a portion of which the temperature has risen so that information is magnetically recorded. Since efficiency for converting laser light into near-field light is low, most of the energy of laser light is converted into heat. For this reason, it is desirable that heat near the near field transducer be efficiently dissipated.

BRIEF DESCRIPTION OF THE DRAWINGS

FIG. 19 is a cross-sectional view of a magnetic head of a modification of the third embodiment taken in the cross-track direction.

DETAILED DESCRIPTION

In general, according to one embodiment, there is provided a magnetic head including a wave guide, a near field transducer, a writing magnetic pole, a magnetic core, a writing coil, and a first temperature control element. The near field transducer is disposed on an ABS surface and to which light is guided from the wave guide. The writing magnetic pole is disposed on the ABS surface. The magnetic core is connected to the writing magnetic pole so as to generate a magnetic field from a portion of the writing magnetic pole close to the ABS surface. The writing coil is disposed so as to go around the magnetic core. The first temperature control element is disposed in contact with a region of a first side surface of the wave guide near the near field transducer.

Exemplary embodiments of a magnetic disk drive will be explained below in detail with reference to the accompanying drawings. The present invention is not limited to the following embodiments.

First Embodiment

Figure 1:
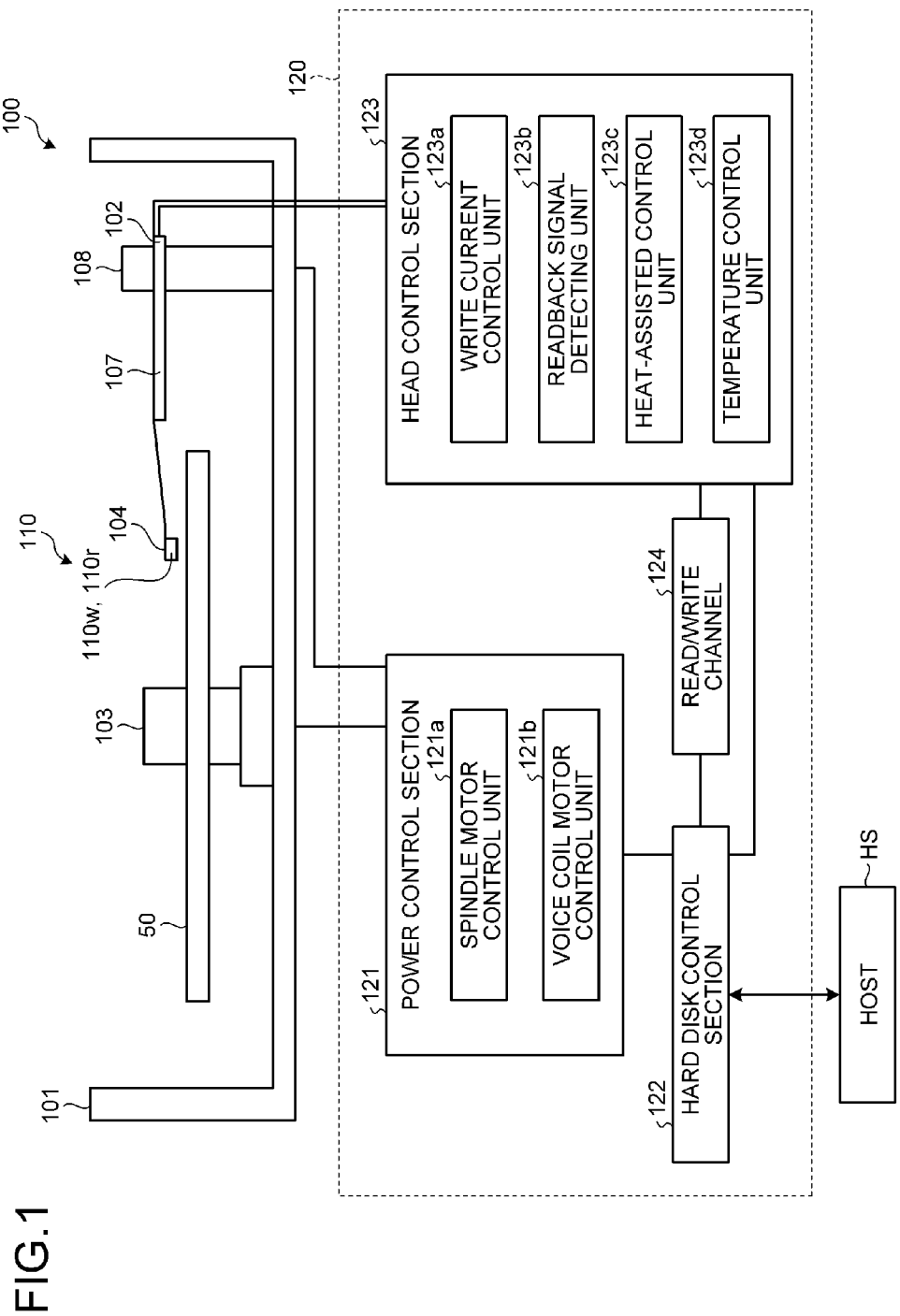
FIG. 1 is a diagram illustrating configuration of a magnetic disk drive according to a first embodiment.

The summary of a magnetic disk drive 100 according to a first embodiment will be described with reference to FIG. 1. FIG. 1 is a diagram illustrating the cross-sectional configuration of a part of the magnetic disk drive 100 and the functional configuration of the other part thereof.

A magnetic disk 50 is a disk recording medium on which various kinds of information is recorded, and is rotationally driven by a spindle motor 103. The magnetic disk 50 includes a perpendicular recording layer that has anisotropy in a direction perpendicular to the surface. For example, the magnetic disk 50 includes a plurality of tracks that are concentric about the vicinity of the center of rotation of the spindle motor 103.

The writing and reading to and from the magnetic disk 50 are performed by a magnetic head 110 that is provided at one end of an arm 107 as a head support mechanism through a head slider 104. The magnetic head 110 includes a write head 110w and a read head 110r.

While being slightly floated from the surface of the magnetic disk 50 by lift that is generated by the rotation of the magnetic disk 50, the write head 110w is moved relative to the surface of the magnetic disk 50 in a down-track direction and writes information on the magnetic disk 50. In this case, the write head 110w converts laser light into near-field light according to a heat-assisted writing method by a near field transducer 5 (see FIG. 2), makes the temperature of the magnetic disk 50 rise locally by irradiating a part of the surface of the magnetic disk 50 with the converted near-field light, and magnetically writes information by applying a magnetic field to a portion of which the temperature has risen. That is, the write head 110w is used for a write operation that is performed on the magnetic disk 50 according to the heat-assisted writing method. Meanwhile, an ABS (Air Bearing Surface) surface 40 (see FIG. 3) is the surface of the end of the write head 110w facing the magnetic disk 50, and is also called a head floating surface.

While being slightly floated from the surface of the magnetic disk 50 by lift that is generated by the rotation of the magnetic disk 50, the read head 110r is moved relative to the surface of the magnetic disk 50 in the down-track direction and reads information recorded on the magnetic disk 50. That is, the read head 110r is used for a read operation that is performed on the magnetic disk 50.

The arm 107 is rotated on a circular arc, which has a center on a shaft 108, by the drive of a voice coil motor 102 as a head drive mechanism provided at the other end of the arm 107, so that the write head 110w and the read head 110r are seek-moved in a cross-track direction of the magnetic disk 50 and change a track on which read and write are performed. The magnetic disk 50, the magnetic head 110, the voice coil motor 102, and the spindle motor 103 are placed in a case 101.

Further, as illustrated in FIG. 1, the magnetic disk drive 100 includes a magnetic record controller 120. The magnetic record controller 120 includes a head control section 123, a power control section 121, a read/write channel 124, and a hard disk control section 122. The head control section 123 includes a write current control unit 123a, a readback signal detecting unit 123b, a heat-assisted control unit 123c, and a temperature control unit 123d. The power control section 121 includes a spindle motor control unit 121a and a voice coil motor control unit 121b.

Figure 2:
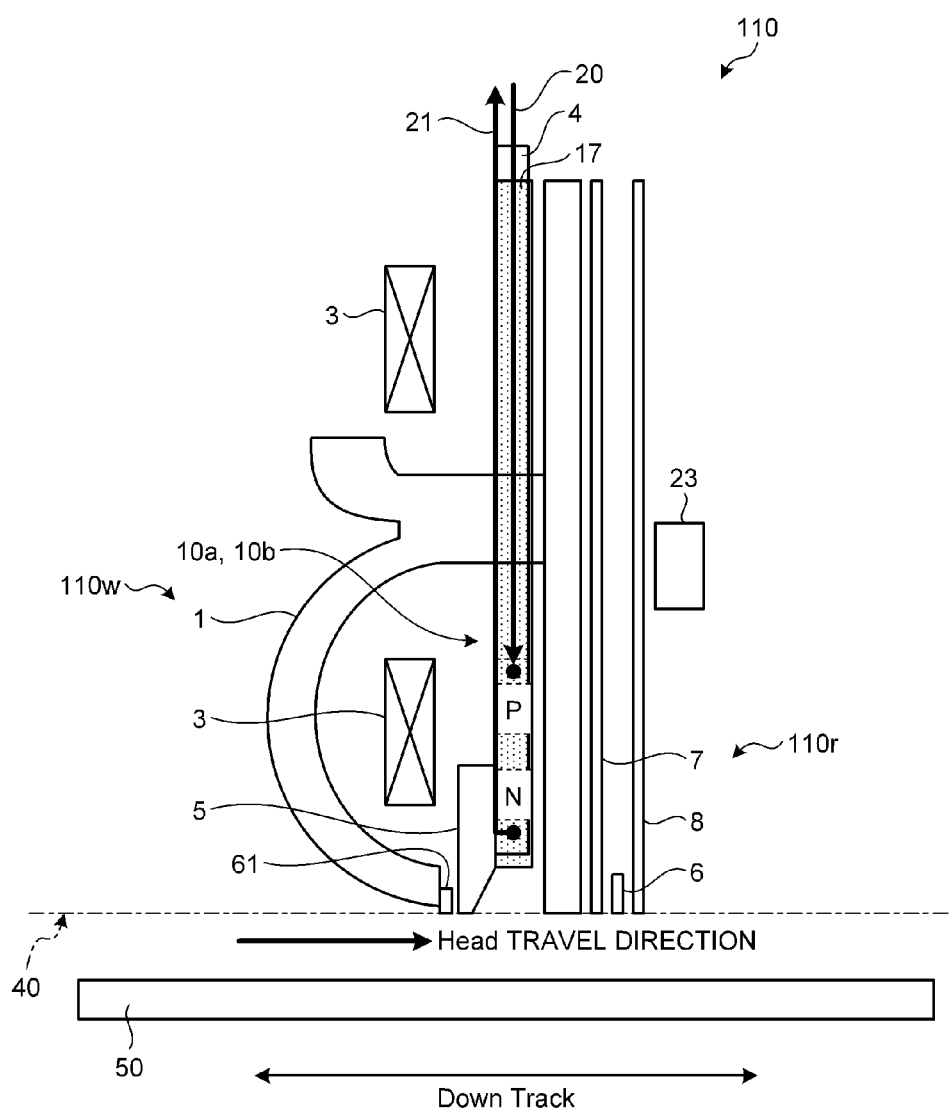
FIG. 2 is a cross-sectional view of a magnetic head of the first embodiment taken in a down-track direction.
Figure 3:
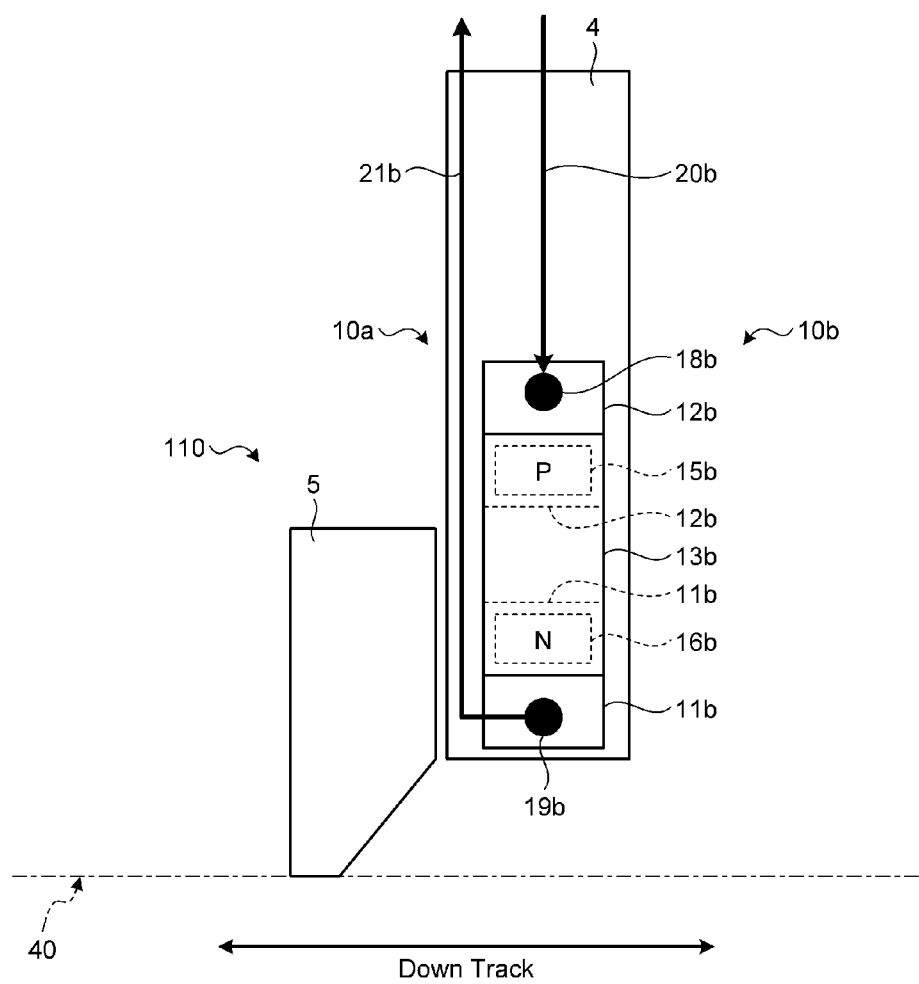
FIG. 3 is an enlarged cross-sectional view of the magnetic head of the first embodiment taken in the down-track direction.
Figure 4:
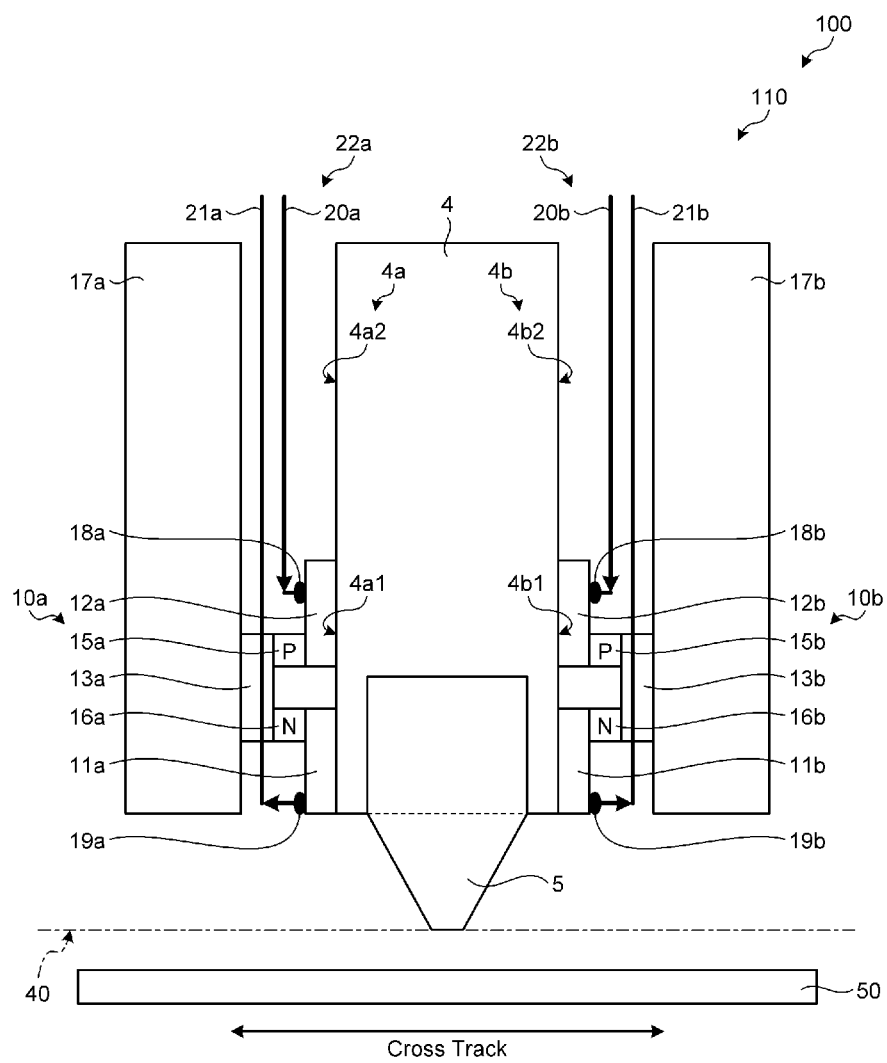
FIG. 4 is a cross-sectional view of the magnetic head of the first embodiment taken in a cross-track direction.

Next, the configuration of the magnetic head 110 will be described with reference to FIGS. 2 to 4. FIG. 2 is a cross-sectional view of the magnetic head 110 taken in the down-track direction. FIG. 3 is an enlarged cross-sectional view of the magnetic head 110 taken in the down-track direction. FIG. 4 is a cross-sectional view of the magnetic head 110 taken in the cross-track direction.

The magnetic head 110 is provided on the trailing end side of the head slider 104 (see FIG. 1). Meanwhile, in FIG. 2, the left side is the trailing side and the right side is the leading side. The magnetic head 110 includes the write head 110w on the trailing side, and includes the read head 110r on the leading side. Further, the magnetic head 110 includes a heater 23. The heater 23 is provided on the leading side of the read head 110r.

The read head 110r includes a magnetoresistive effect element 6, a shield 7, and a shield 8. The shield 7 and the shield 8 are disposed so that the magnetoresistive effect element 6 is interposed between the shields 7 and 8 in a head travel direction. Accordingly, while being magnetically shielded from both sides in the head travel direction by the shields 7 and 8, the magnetoresistive effect element 6 reads the information recorded on the magnetic disk 50.

The write head 110w includes a writing magnetic pole 61, a magnetic core 1, a writing coil 3, a wave guide 4, and the near field transducer 5.

The writing magnetic pole 61 is disposed on the ABS surface 40 and on the trailing side of the near field transducer 5 and the wave guide 4. For example, the writing magnetic pole 61 is disposed so that the end face of the writing magnetic pole 61 close to the magnetic disk 50 is positioned on the ABS surface 40. The writing magnetic pole 61 is disposed near the near field transducer 5, and is made of a soft magnetic material.

The magnetic core 1 is connected to the writing magnetic pole 61 so as to generate a magnetic field from a portion of the writing magnetic pole 61 close to the ABS surface 40. The magnetic core 1 protrudes toward the trailing side from the upper side of the near field transducer 5 in FIG. 2, extends so as to go downward toward the ABS surface 40, and is connected to the writing magnetic pole 61. The magnetic core 1 is made of a soft magnetic material.

The writing coil 3 is disposed so as to go around the magnetic core 1 on the trailing side of the near field transducer 5 and the wave guide 4. The writing coil 3 is wound so as to go around the magnetic core 1 along a plane parallel to a longitudinal direction perpendicular to the plane of FIG. 2. Accordingly, when current flowing in the writing coil 3 is controlled, the writing magnetic pole 61 generates a magnetic field through the magnetic core 1 and writes information on the magnetic disk 50. The writing coil 3 is made of a conductor such as metal (for example, Cu).

The wave guide 4 extends to the vicinity of the near field transducer 5 from a light source (for example, a laser diode (not illustrated)). Accordingly, the wave guide 4 receives light (for example, laser light) emitted from the light source and guides the light to the near field transducer 5. A case in which the wave guide 4 has the shape of a plate is exemplified in FIGS. 2 to 4. However, as long as the wave guide 4 can guide light to the near field transducer 5, the wave guide 4 may have another shape (for example, a rectangular parallelepiped shape or the like).

The near field transducer 5 is disposed on the ABS surface 40. The near field transducer 5 converts the guided light (for example, laser light) into near-field light, and irradiates a portion, which is to be subjected to the writing of the writing magnetic pole 61, of the surface of the magnetic disk 50 with the converted near-field light. Accordingly, heat is applied to the portion, which is to be subjected to the writing of the writing magnetic pole 61, of the surface of the magnetic disk 50. For this reason, the perpendicular recording layer of this portion is heated to high temperature that is equal to or higher than the Curie point and an anisotropy magnetic field is reduced, so that information is easily recorded by the writing magnetic pole 61.

At this time, the efficiency of the near field transducer 5, which converts light into near-field light, is about 10%. About 10% of the energy of light is converted into near-field light and 90% the energy of light, which is the rest thereof, is converted into heat. For this reason, it is necessary to dissipate the heat of the near field transducer 5.

The inventor has examined the configuration to which a heat sink (not illustrated) disposed in thermal contact with the near field transducer 5 is further added in order to reduce the protrusion of the near field transducer 5 that is caused by the heat generation of the near field transducer 5. Specifically, the inventor has examined a method of controlling distances between the magnetic disk 50 and a write element (writing magnetic pole 61) and/or a read element (magnetoresistive effect element 6) according to the amount of heat applied from the heater 23 in this configuration. As a result, the inventor has found that it is difficult to maintain a spacing between the near field transducer 5 and the magnetic disk 50 constant since the protruding length of the near field transducer 5 is temporarily increased due to a difference between the time constant of the heat generation of the near field transducer 5 caused by the converted heat and the time constant of the heat generation of the heater 23 when the operation of the magnetic head 110 is switched to a write operation from a read operation (see characteristics represented by broken lines of 7C and 7I of FIG. 6). There is a possibility that the reliability of the magnetic disk drive 100 deteriorates due to the collision between the near field transducer 5 and the surface of the magnetic disk 50 or the like when the protruding length of the near field transducer 5 is temporarily increased.

As a result of further examination, the inventor has found that the time constant of the heat generation of the near field transducer 5 caused by the converted heat is smaller than the time constant of the heat generation of the heater 23 and it is necessary to efficiently dissipate the heat of the near field transducer 5 as compared to the configuration using the heat sink disposed in thermal contact with the near field transducer 5 when the operation of the magnetic head is switched to a write operation from a read operation, in the above-mentioned configuration.

Accordingly, this embodiment, in order to efficiently dissipate the heat of the near field transducer 5, controls the temperature of the wave guide 4 (for example, absorbing heat) by temperature control elements without using a heat sink that is disposed in thermal contact with the near field transducer 5, for example, when the operation of the magnetic head 110 is switched to a write operation from a read operation.

Specifically, the write head 110*w* of the magnetic head 110 further includes temperature control elements 10*a* and 10*b* as illustrated in FIGS. 2 to 4.

The temperature control elements 10*a* and 10*b* are disposed in contact with the wave guide 4 at positions that are disposed on the plane of the wave guide 4 orthogonal to the cross-track direction and that are not exposed to the ABS surface 40. That is, the temperature control elements 10*a* and 10*b* are disposed in contact with regions 4*a*1 and 4*b*1 of side surfaces 4*a* and 4*b* of the wave guide 4 near the near field transducer 5. The side surface 4*b* is the side surface of the wave guide 4 opposite to the side surface 4*a*. The regions 4*a*1 and 4*b*1 of the side surfaces 4*a* and 4*b* are positioned closer to the near field transducer 5 (that is, near the near field transducer 5) than regions 4*a*2 and 4*b*2. The temperature control elements 10*a* and 10*b* control the temperature of the wave guide 4, for example, when the operation of the magnetic head 110 is switched to a write operation from a read operation. The temperature control elements 10*a* and 10*b* control the temperature of the wave guide 4 by absorbing the heat of the wave guide 4 when the operation of the magnetic head 110 is switched to a write operation from a read operation.

Specifically, the temperature control element 10*a* includes an electrode 11*a*, an electrode 12*a*, an electrode 13*a*, a semiconductor 16*a*, a semiconductor 15*a*, a heat sink 17*a*, and a wiring 22*a*.

The electrode 11*a* is disposed in contact with the region 4*a*1 of the side surface 4*a* of the wave guide 4 so as to be separated from the electrode 12*a*. The electrode 11*a* is positioned closer to the ABS surface 40 than the electrode 12*a*, and extends along the side surface 4*a*. The electrode 11*a* is made of a conductor such as metal, and is electrically and thermally connected to the electrode 13*a* through the semiconductor 16*a*. An end portion of the electrode 11*a* distant from the ABS surface 40 is electrically and thermally connected to the electrode 13*a* through the semiconductor 16*a*.

The electrode 12*a* is disposed in contact with the region 4*a*1 of the side surface 4*a* of the wave guide 4 so as to be separated from the electrode 11*a*. The electrode 12*a* is positioned more distant from the ABS surface 40 than the electrode 11*a*, and extends along the side surface 4*a*. The electrode 12*a* is made of a conductor such as metal, and is electrically and thermally connected to the electrode 13*a* through the semiconductor 15*a*. An end portion of the electrode 12*a* close to the ABS surface 40 is electrically and thermally connected to the electrode 13*a* through the semiconductor 15*a*.

The electrode 13*a* is disposed on the side of the electrodes 11*a* and 12*a*. The electrode 13*a* is disposed so as to face the electrodes 11*a* and 12*a*. The electrode 13*a* extends in parallel with the side surface 4*a*. The electrode 13*a* is disposed at a position corresponding to a space between the electrodes 11*a* and 12*a* in a direction perpendicular to the ABS surface 40. The electrode 13*a* is made of a conductor such as metal. The electrode 13*a* is electrically and thermally connected to the electrode 11*a* through the semiconductor 16*a*, and is electrically and thermally connected to the electrode 12*a* through the semiconductor 15*a*. An end portion of the electrode 13*a* close to the ABS surface 40 is electrically and thermally connected to the electrode 11*a* through the semiconductor 16*a*, and an end portion of the electrode 13*a* distant from the ABS surface 40 is electrically and thermally connected to the electrode 12*a* through the semiconductor 15*a*.

The semiconductor 16*a* is disposed between the electrodes 11*a* and 13*a*. The semiconductor 16*a* contains a first conductivity type (for example, N-type) impurity (for example, phosphorus, arsenic, or the like). The semiconductor 16*a* is a semiconductor that contains the first conductivity type impurity, and is a semiconductor such as silicon. One end of the semiconductor 16*a* is disposed in contact with the electrode 11*a*, and the other end thereof is disposed in contact with the electrode 13*a*. When been seen through in the direction perpendicular to the side surface 4*a*, the semiconductor 16*a* is disposed so as to be included in a region where the electrodes 11*a* and 13*a* overlap each other (see FIG. 3).

The semiconductor 15*a* is disposed between the electrodes 12*a* and 13*a*. The semiconductor 15*a* contains a second conductivity type (for example, P-type) impurity (for example, boron, aluminum, or the like). The second conductivity type is a conductivity type opposite to the first conductivity type. The semiconductor 15*a* is a semiconductor that contains the second conductivity type impurity, and is a semiconductor such as silicon. One end of the semiconductor 15*a* is disposed in contact with the electrode 12*a*, and the other end thereof is disposed in contact with the electrode 13*a*. When been seen through in the direction perpendicular to the side surface 4*a*, the semiconductor 15*a* is disposed so as to be included in a region where the electrodes 12*a* and 13*a* overlap each other (see FIG. 3).

The heat sink 17*a* is disposed in contact with the electrode 13*a*. The heat sink 17*a* protrudes in a direction substantially perpendicular to the side surface 4*a* of the wave guide 4, and extends in parallel with the side surface 4*a* of the wave guide 4. The heat sink 17*a* is thermally connected to the electrode 13*a*. Accordingly, the heat sink 17*a* can dissipate the heat of the electrode 13*a* to the ambient atmosphere (for example, the air).

The wiring 22*a* is adapted so that current flows between the electrodes 11*a* and 12*a*. The wiring 22*a* includes a line 20*a*, a line 21*a*, a terminal 18*a*, and a terminal 19*a*. The line 20*a* is electrically connected to the electrode 12*a* through the terminal 18*a*. The line 21*a* is electrically connected to the electrode 11*a* through the terminal 19*a*. Current, which corresponds to an applied voltage V, is supplied to the terminals 18*a* and 19*a* from the head control section 123 through the lines 20*a* and 21*a*.

When the first conductivity type is an N-type and the second conductivity type is a P-type in the wiring 22*a* and current flows in a direction represented by arrows of FIGS. 2 to 4, the vicinity of an interface between the electrode 11*a* and the semiconductor 16*a* and the vicinity of an interface between the electrode 12a and the semiconductor 15a act as a heat absorbing surface and the vicinity of an interface between the electrode 13a and the semiconductor 16a and the vicinity of an interface between the electrode 13a and the semiconductor 15a act as a heat generating surface. That is, when current flows through the wiring 22a in the direction represented by the arrows of FIGS. 2 to 4, the temperature control element 10a can absorb the heat of the wave guide 4 through the electrodes 11a and 12a and dissipate the absorbed heat to the ambient atmosphere (for example, the air) through the electrode 13a and the heat sink 17a. Meanwhile, when the first conductivity type is a P-type and the second conductivity type is an N-type, it is possible to operate the temperature control element 10a in the same manner by making current flow in a direction opposite to the direction represented by the arrows of FIGS. 2 to 4.

Further, when the first conductivity type is an N-type and the second conductivity type is a P-type in the wiring 22a and current flows in a direction opposite to the direction represented by the arrows of FIGS. 2 to 4, the vicinity of an interface between the electrode 11a and the semiconductor 16a and the vicinity of the interface between the electrode 12a and the semiconductor 15a act as a heat generating surface and the vicinity of the interface between the electrode 13a and the semiconductor 16a and the vicinity of the interface between the electrode 13a and the semiconductor 15a act as a heat absorbing surface. That is, when current flows through the wiring 22a in the direction opposite to the direction represented by the arrows of FIGS. 2 to 4, the temperature control element 10a can absorb the heat of the ambient atmosphere (for example, the air) through the heat sink 17a and the electrode 13a and supply the absorbed heat to the wave guide 4 through the electrodes 11a and 12a. Meanwhile, when the first conductivity type is a P-type and the second conductivity type is an N-type, it is possible to operate the temperature control element 10a in the same manner by making current flow in the direction represented by the arrows of FIGS. 2 to 4.

Like in the above description, the temperature control element 10b includes an electrode 11b, an electrode 12b, an electrode 13b, a semiconductor 16b, a semiconductor 15b, a heat sink 17b, and a wiring 22b. Meanwhile, when an index "a" is substituted with an index "b", the description of each portion of the temperature control element 10a also can be applied to each portion of the temperature control element 10b alike.

Figure 5:
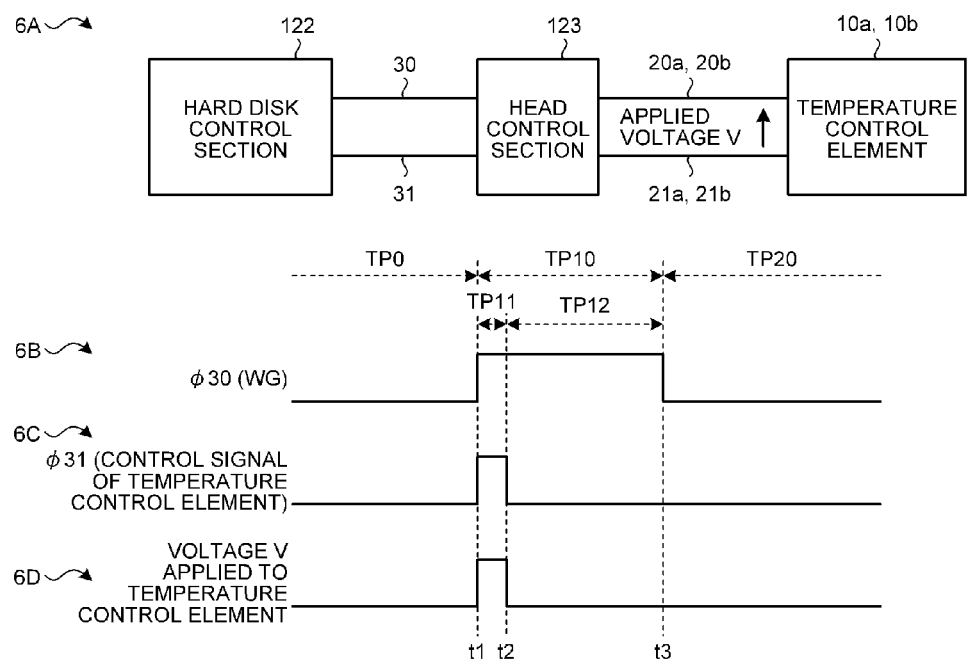
FIG. 5 is a diagram illustrating control timings of temperature control elements of the first embodiment.

Next, the control timings of the temperature control elements 10a and 10b will be described with reference to FIG. 5. FIG. 5 is a diagram illustrating the control timings of the temperature control elements 10a and 10b.

As illustrated in 6A of FIG. 5, the hard disk control section 122 of the magnetic record controller 120 (see FIG. 1) supplies a control signal to the head control section 123 through lines 30 and 31 and a read/write channel 124 (see FIG. 1). The head control section 123 supplies an applied voltage V and current, which corresponds to the applied voltage V, to the temperature control elements 10a and 10b through the lines 20a, 21a, 20b, and 21b. Meanwhile, the read/write channel 124 is not illustrated in 6A of FIG. 5.

As illustrated in 6B of FIG. 5, the timing of writing data on the magnetic disk 50 is controlled by a Write Gate (WG) signal φ30 that is a data write signal. The WG signal φ30 is supplied to the head control section 123 from the hard disk control section 122 through the line 30. While the WG signal φ30 is at an active level (H level in the case of FIG. 5), that is, in a write period TP10, the head control section 123 writes a signal on the magnetic disk 50 by controlling the write head 110w. The write period TP10 starts at a timing t1 and ends at a timing t3.

As illustrated in 6C of FIG. 5, a control signal φ31 of the temperature control elements 10a and 10b is supplied to the head control section 123 from the hard disk control section 122 through the line 31. While the control signal φ31 is at an active level (H level in the case of FIG. 5), that is, in a period TP11 in which the operation of the magnetic head 110 is switched to a write operation from a read operation, the head control section 123 adjusts the applied voltage V so that the control of the temperature of the wave guide 4 of the magnetic head 110 is turned on. The period TP11 starts at the timing t1 and ends at a timing t2. Further, in a period TP12 subsequent to the period TP11, the head control section 123 adjusts the applied voltage V so that the control of the temperature of the wave guide 4 of the magnetic head 110 is turned off. The period TP12 starts at the timing t2 and ends at the timing t3.

As illustrated in 6D of FIG. 5, the voltage V applied to the temperature control elements 10a and 10b is supplied to the temperature control elements 10a and 10b through the lines 20a, 21a, 20b, and 21b. In the period TP11 in which the control signal φ31 is at an active level, the head control section 123 adjusts the applied voltage V to an ON-level and supplies the voltage to the temperature control elements 10a and 10b. In the period TP12 in which the control signal φ31 is at a non-active level, the head control section 123 adjusts the applied voltage V to an OFF-level and supplies the voltage to the temperature control elements 10a and 10b.

Figure 6:
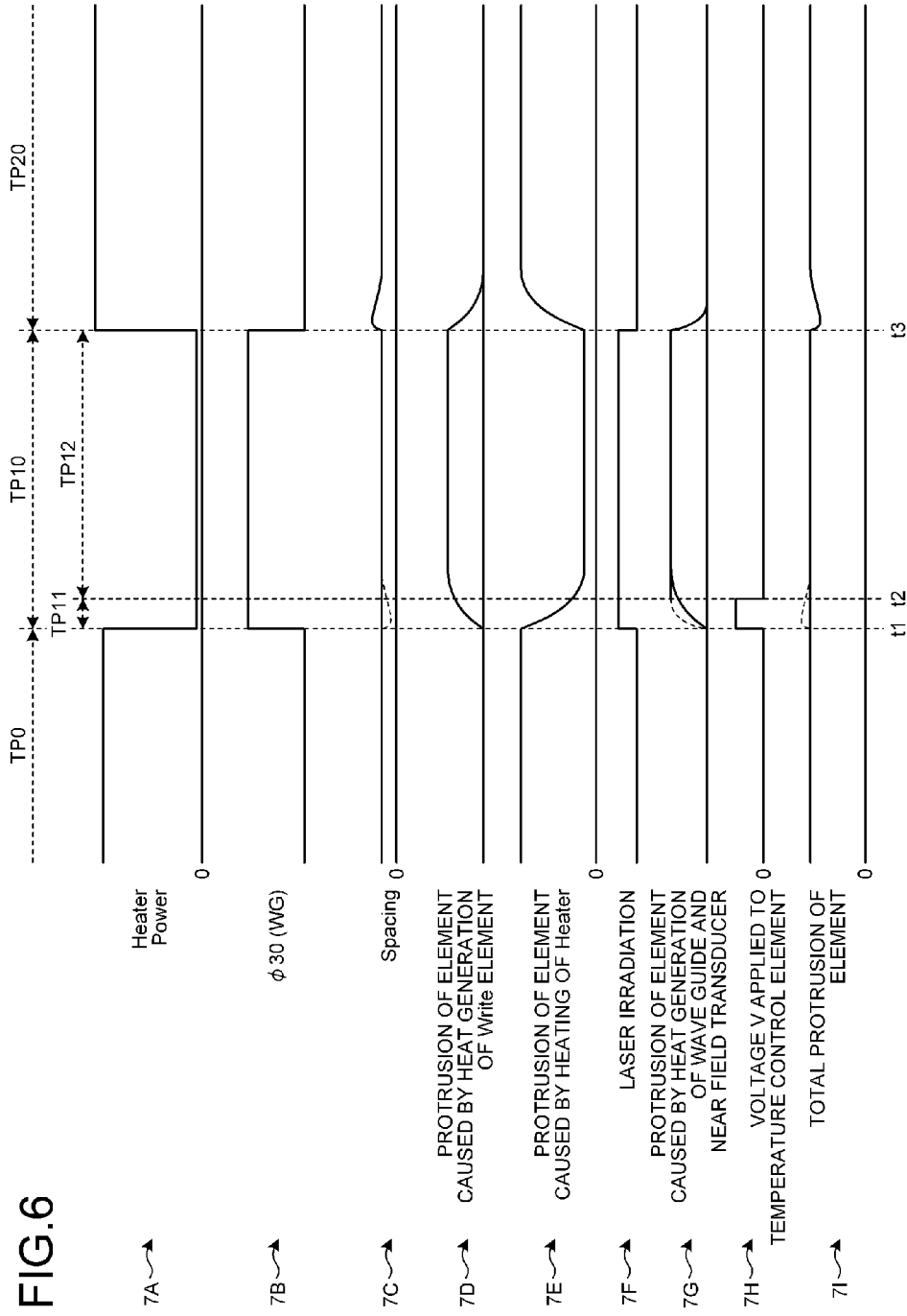
FIG. 6 is a diagram illustrating control timings of the temperature control elements of the first embodiment and operation timing of the magnetic head.

Next, a relationship between the control timings of the temperature control elements 10a and 10b and the operation timing of the magnetic head 110 will be described with reference to FIG. 6. FIG. 6 is a diagram illustrating the control timings of the temperature control elements 10a and 10b and the operation timing of the magnetic head 110.

Immediately before the timing t1, the WG signal 430 is at a non-active level. According to this, the head control section 123 controls the magnetic head 110 so that the magnetic head 110 performs a read operation. That is, a period TP0 until the timing t1 is a read period.

At the timing t1, the WG signal φ30 is switched to an active level (H level) from a non-active level. According to this, the head control section 123 controls the magnetic head 110 so that the magnetic head 110 starts a write operation. That is, the write period TP10 starts from the timing t1.

Further, the power of the heater 23 is changed to a level for a write period from a level for a read period (see 7A of FIG. 6). Accordingly, protrusion caused by the heat generation of the write element illustrated in 7D of FIG. 6 and the protrusion of the element caused by the heating of the heater 23 illustrated in 7E of FIG. 6 may occur. Furthermore, as illustrated in 7F of FIG. 6, laser irradiation is performed and laser light is guided to the near field transducer 5 through the wave guide 4. Accordingly, as illustrated in 7G of FIG. 6 by a broken line, the protrusion of the near field transducer 5 caused by the converted heat may occur.

If the time constant of the heat generation of the near field transducer 5 caused by the converted heat is smaller than the time constant of the heat generation of the heater 23 at this time, the total protruding length of the element is temporarily increased as illustrated in 7C and 7I of FIG. 6 by broken lines. For this reason, it is difficult to maintain a spacing between the near field transducer 5 and the magnetic disk 50 constant.

Accordingly, in this embodiment, the temperature control elements 10a and 10b control the temperature of the wave guide 4 in the period TP11 between the timings t1 and t2 as illustrated in 7H of FIG. 6. The voltage V is applied to the temperature control elements 10a and 10b, so that current in the direction represented by the arrows of FIGS. 2 to 4 flows. Accordingly, the temperature control elements 10a and 10b absorb the heat of the wave guide 4 through the electrodes 11a, 12a, 11b, and 12b, and can dissipate the heated heat to the ambient atmosphere (air) through the electrodes 13a and 13b and the heat sinks 17a and 17b.

Therefore, the time constant of the protrusion of the near field transducer 5 caused by the converted heat can be substantially equal to the time constant of the protrusion of the element caused by the heating of the heater 23 (see 7E of FIG. 6) as illustrated in 7G of FIG. 6 by a solid line. As a result, since it is possible to suppress the total protruding length of the element, it is possible to maintain a spacing between the near field transducer 5 and the magnetic disk 50 constant.

Meanwhile, the length of the period TP11 may be obtained by experimentally acquiring the length corresponding to the time constant of the heat generation of the near field transducer 5 when the control of temperature is not performed by the temperature control elements 10a and 10b. The length of the period TP11 may be the length of time (see characteristics represented by a broken line of 7G of FIG. 6) taken until the protrusion of the element caused by the heat generation of the near field transducer 5 reaches a value at the time of stability when the control of temperature is not performed by the temperature control elements 10a and 10b.

In the period TP12 between the timings t2 and t3, the WG signal φ30 is maintained at an active level (for example, H level). According to this, the head control section 123 controls the magnetic head 110 so that the magnetic head 110 continues to perform a write operation.

Further, the power of the heater 23 is maintained at a level for a write period (see 7A of FIG. 6). Accordingly, the protrusion of the element caused by the heating of the heater 23 is stable as illustrated in 7E of FIG. 6. Furthermore, as illustrated in 7F of FIG. 6, laser irradiation is performed and laser light continues to be guided to the near field transducer 5 through the wave guide 4. For this reason, as illustrated in 7G of FIG. 6 by a solid line, the protrusion of the near field transducer 5 caused by the converted heat is stable.

Accordingly, in this embodiment, a state in which the control of the temperature of the wave guide 4 performed by the temperature control elements 10a and 10b is turned off is maintained in the period TP12 between the timings t2 and t3 as illustrated in 7H of FIG. 6. Since the protrusion of the near field transducer 5 caused by the converted heat and the protrusion of the element caused by the heating of the heater 23 are stable together even though the control of the temperature of the wave guide 4 is turned off, it is possible to maintain a spacing between the near field transducer 5 and the magnetic disk 50 constant.

At the timing t3, the WG signal φ30 is switched to a non-active level (for example, L level) from an active level (for example, H level). Further, the power of the heater 23 is changed to a level for a read period from a level for a write period (see 7A of FIG. 6). According to this, the head control section 123 controls the magnetic head 110 so that the magnetic head 110 starts a read operation. That is, the period TP10 between the timings t1 and t3 is a write period, and a period TP20 subsequent to the timing t3 is a read period.

Figure 7:
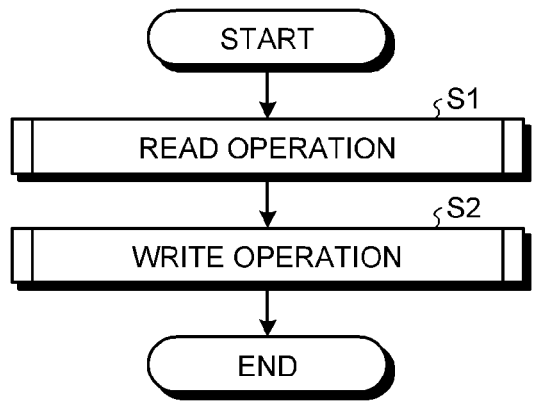
FIG. 7 is a flowchart illustrating operation of the magnetic head of the first embodiment.

Next, the operation of the magnetic head 110 will be described with reference to FIG. 7. FIG. 7 is a flowchart illustrating the operation of the magnetic head 110.

In Step S1, the magnetic head 110 performs a read operation. Specifically, the hard disk control section 122 supplies a WG signal φ30, which corresponds to a non-active level, to the head control section 123 through the line 30. Accordingly, the head control section 123 controls the magnetic head 110 so that the magnetic head 110 performs a read operation.

In Step S2, the magnetic head 110 performs a write operation. Specifically, the hard disk control section 122 supplies a WG signal φ30, which corresponds to a non-active level, to the head control section 123 through the line 30. Accordingly, the head control section 123 controls the magnetic head 110 so that the magnetic head 110 performs a write operation.

Figure 8:
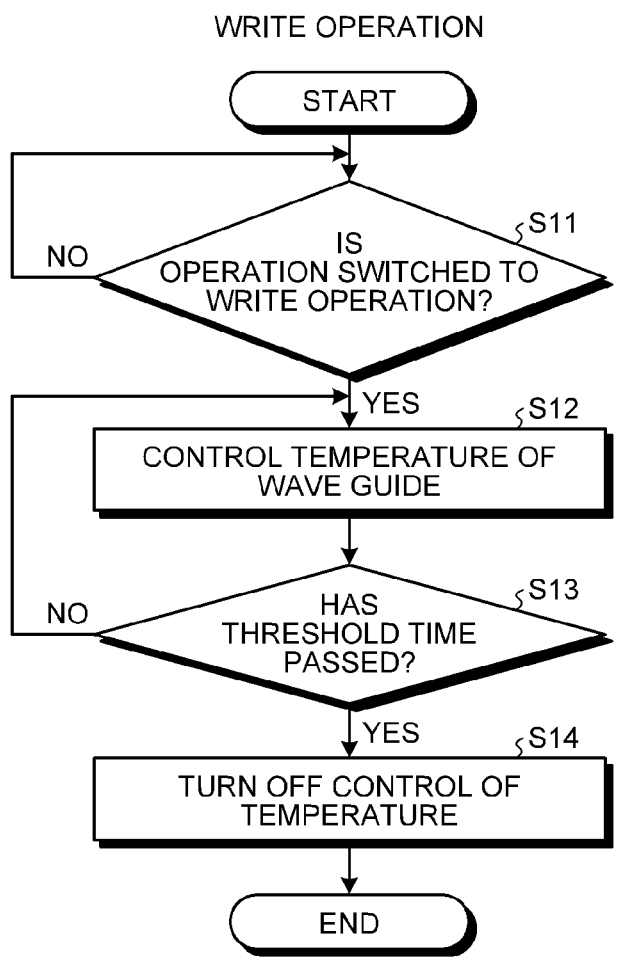
FIG. 8 is a flowchart illustrating write operation of the magnetic head of the first embodiment.

Next, the write operation of the magnetic head 110 will be described with reference to FIG. 8. FIG. 8 is a flowchart illustrating the write operation of the magnetic head 110.

In Step S11, the hard disk control section 122 determines whether or not to switch the operation of the magnetic head 110 to a write operation.

When the hard disk control section 122 receives a write switching instruction for switching an operation to a write operation from a host HS (see FIG. 1), the hard disk control section 122 determines that the operation of the magnetic head 110 should be switched to a write operation. When the hard disk control section 122 does not receive a write switching instruction, the hard disk control section 122 determines that the operation of the magnetic head 110 should not be switched to a write operation.

Alternatively, when the hard disk control section 122 receives data to be written from the host HS (see FIG. 1), the hard disk control section 122 determines that the operation of the magnetic head 110 should be switched to a write operation. When the hard disk control section 122 does not receive data to be written, the hard disk control section 122 determines that the operation of the magnetic head 110 should not be switched to a write operation.

If the hard disk control section 122 determines that the operation of the magnetic head 110 should be switched to a write operation (Yes in Step S11), a process proceeds to Step S12. If the hard disk control section 122 determines that the operation of the magnetic head 110 should not be switched to a write operation (No in Step S11), the process returns to Step S11.

In Step S12, the hard disk control section 122 supplies a control signal φ31, which corresponds to an active level, to the head control section 123 through the line 31 and starts a count operation of a timer (not illustrated). Accordingly, the head control section 123 adjusts the applied voltage V to an ON-level and supplies the voltage to the temperature control elements 10a and 10b. That is, the head control section 123 starts the control of the temperature of the wave guide 4 that is performed by the temperature control elements 10a and 10b.

Further, the hard disk control section 122 supplies a WG signal φ30, which corresponds to an active level, to the head control section 123 through the line 30. Accordingly, the head control section 123 controls the magnetic head 110 so that the magnetic head 110 starts a write operation.

In Step S13, the hard disk control section 122 determines whether or not threshold time Tth1 has passed from the start of the control of the temperature of the wave guide 4. If counted time is equal to or longer than the threshold time Tth1, the hard disk control section 122 determines that the threshold time Tth1 has passed with reference to time counted by the time. If counted time is shorter than the threshold time Tth1, the hard disk control section 122 determines that the threshold time Tth1 does not have passed. Meanwhile, the threshold time Tth1 corresponds to the length of the period TP11 (see FIGS. 5 and 6), and is time that is obtained by subtracting the response time of a switching operation from the length of the period TP11.

If the hard disk control section 122 determines that the threshold time Tth1 has passed (Yes in Step S13), the process proceeds to Step S14. If the hard disk control section 122 determines that the threshold time Tth1 does not have passed (No in Step S13), the process returns to Step S12.

In Step S14, the hard disk control section 122 supplies a control signal ϕ31, which corresponds to a non-active level, to the head control section 123 through the line 31. Accordingly, the head control section 123 adjusts the applied voltage V to an OFF-level and supplies the voltage to the temperature control elements 10a and 10b. That is, the head control section 123 turns off the control of the temperature of the wave guide 4 that is performed by the temperature control elements 10a and 10b.

Further, the hard disk control section 122 continues to supply a WG signal ϕ30, which corresponds to an active level, to the head control section 123 through the line 30. Accordingly, the head control section 123 controls the magnetic head 110 so that the magnetic head 110 continues to perform a write operation.

As described above, in the first embodiment, in the magnetic head 110, the temperature control element (first temperature control element) 10a is disposed in contact with the region 4a1 of the side surface 4a of the wave guide 4 close to the near field transducer 5. With this arrangement, for example, when the operation of the magnetic head 110 is switched to a write operation from a read operation, it is possible to control the temperature of the wave guide 4 (for example, absorb heat) by the temperature control element. As a result, since it is possible to suppress the temporary increase of the protruding length of the near field transducer 5 when the operation of the magnetic head 110 is switched to a write operation from a read operation, it is possible to easily maintain a spacing between the near field transducer 5 and the magnetic disk 50 constant.

Figure 9:
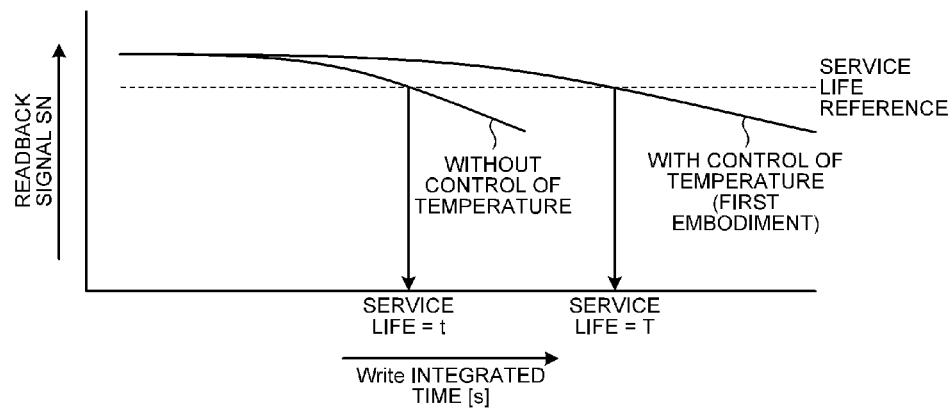
FIG. 9 is a diagram illustrating service life of an element in the first embodiment.

Accordingly, it is possible to suppress collision and the like between the near field transducer 5 and the surface of the magnetic disk 50. Therefore, it is possible to improve the reliability of the magnetic disk drive 100. It is possible to significantly increase a service life T where the reliability of the write head 110w deteriorates to service life reference (the deterioration of writing capacity or the like) with the integrated time (or the number of times) of a write operation as illustrated in FIG. 9, as compared to a service life t when the control of temperature is not performed. Meanwhile, FIG. 9 is a diagram illustrating the service life of the element in the first embodiment.

Further, in the first embodiment, the temperature control element (first temperature control element) 10a is disposed in contact with the region 4a1 of the side surface 4a of the wave guide 4 near the near field transducer 5. Accordingly, since it is possible to make a distance between the temperature control element 10a and the near field transducer 5 short as compared to a case in which the temperature control element 10a is disposed in contact with the region 4a2 of the side surface 4a of the wave guide 4 distant from the near field transducer 5, it is possible to efficiently dissipate heat, which is generated by the near field transducer 5, through the wave guide 4 by the temperature control element 10a.

Likewise, the temperature control element (second temperature control element) 10b is disposed in contact with the region 4b1 of the side surface 4b of the wave guide 4 near the near field transducer 5. Accordingly, since it is possible to make a distance between the temperature control element 10b and the near field transducer 5 short as compared to a case in which the temperature control element 10b is disposed in contact with the region 4b2 of the side surface 4b of the wave guide 4 distant from the near field transducer 5, it is possible to efficiently dissipate heat, which is generated by the near field transducer 5, through the wave guide 4 by the temperature control element 10b.

Furthermore, in the first embodiment, in the temperature control element 10a of the magnetic head 110, the heat sink (first heat sink) 17a protrudes in a direction substantially perpendicular to the side surface 4a of the wave guide 4 and extends in parallel with the side surface 4a of the wave guide 4. Accordingly, it is possible to secure the large heat dissipation area of the heat sink 17a while avoiding the interference with members that are disposed around the read head 110r and the like. Therefore, it is possible to improve the heat dissipation capacity of the heat sink 17a.

Likewise, in the temperature control element 10b of the magnetic head 110, the heat sink (second heat sink) 17b protrudes in a direction substantially perpendicular to the side surface 4b of the wave guide 4 and extends in parallel with the side surface 4b of the wave guide 4. Accordingly, it is possible to secure the large heat dissipation area of the heat sink 17b while avoiding the interference with members that are disposed around the read head 110r and the like. Therefore, it is possible to improve the heat dissipation capacity of the heat sink 17b.

Moreover, in the first embodiment, in the magnetic head 110, the temperature control element (first temperature control element) 10a is disposed in contact with the region 4a1 of the side surface 4a of the wave guide 4 close to the near field transducer 5 and the temperature control element (second temperature control element) 10b is disposed in contact with the region 4b1 of the side surface 4b of the wave guide 4 close to the near field transducer 5. That is, since the temperature control elements 10a and 10b are provided on both side surfaces 4a and 4b of the wave guide 4 in the cross-track direction, it is possible to efficiently control the heat of the wave guide 4.

Further, in the first embodiment, in the magnetic head 110, the temperature control element (first temperature control element) 10a and the temperature control element (second temperature control element) 10b control the temperature of the wave guide 4 so as to be synchronized with each other. That is, since the plurality of temperature control elements 10a and 10b, which are provided on both side surfaces 4a and 4b of the wave guide 4, control the temperature of the wave guide 4 in synchronization, it is possible to efficiently control (for example, absorb) the heat of the wave guide 4.

Furthermore, in the first embodiment, in the period (first period) TP11 in which the operation of the magnetic head 110 is switched to a write operation from a read operation, the magnetic record controller 120 of the magnetic disk drive 100 controls the temperature of the wave guide 4 guiding light to the near field transducer 5 of the magnetic head 110 and controls the magnetic head 110 so that the magnetic head 110 starts a write operation. After the write operation of the magnetic head 110 is started and the threshold time (first threshold time) Tth1 has passed, that is, in the period (second period) TP12 subsequent to the period (first period) TP11, the magnetic record controller 120 turns off the control of the temperature of the wave guide 4 of the magnetic head 110 and controls the magnetic head 110 so that the magnetic head 110 continues to perform a write operation. Accordingly, since it is possible to suppress the temporary increase of the protruding length of the near field transducer 5 when the operation of the magnetic head 110 is switched to a write operation from a read operation, it is possible to easily maintain a spacing between the near field transducer 5 and the magnetic disk 50 constant.

Meanwhile, a case in which the temperature control elements 10a and 10b control the temperature of the wave guide 4 in synchronization with each other has been exemplified in FIGS. 5 and 6, but the temperature control elements 10a and 10b may control the temperature of the wave guide 4 independently of each other.

When the amount of heat, which is transferred to the wave guide 4 from the near field transducer 5, differs on both side surfaces 4a and 4b of the wave guide 4, the temperature control elements 10a and 10b can control the temperature of the wave guide 4 on both the respective side surfaces 4a and 4b independently of each other.

Figure 10:
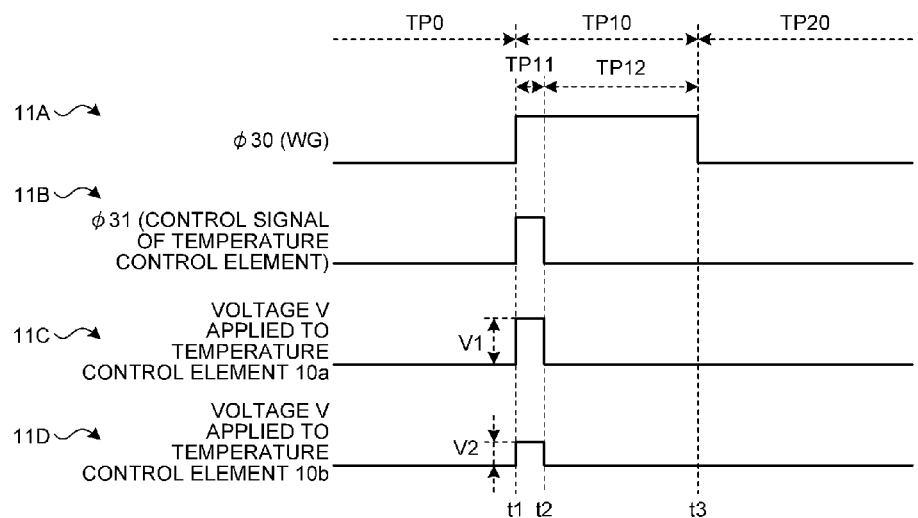
FIG. 10 is a diagram illustrating control timings of temperature control elements of a modification of the first embodiment and operation timing of a magnetic head.

When the amount of heat transferred to the side surface 4a of the wave guide 4 is larger than the amount of heat transferred to the side surface 4b, it is possible to control the temperature control elements 10a and 10b in the period TP11 as illustrated in FIG. 10 so that a difference in the amount of heat is cancelled. That is, it is possible to make a voltage V (=V1), which is applied to the temperature control element 10a from the head control section 123, larger than a voltage V (=V2<V1), which is applied to the temperature control element 10b from the head control section 123, as illustrated in 11C and 11D of FIG. 10. Meanwhile, 11A and 11B of FIG. 10 are the same as 6B and 6C of FIG. 5.

Figure 11:
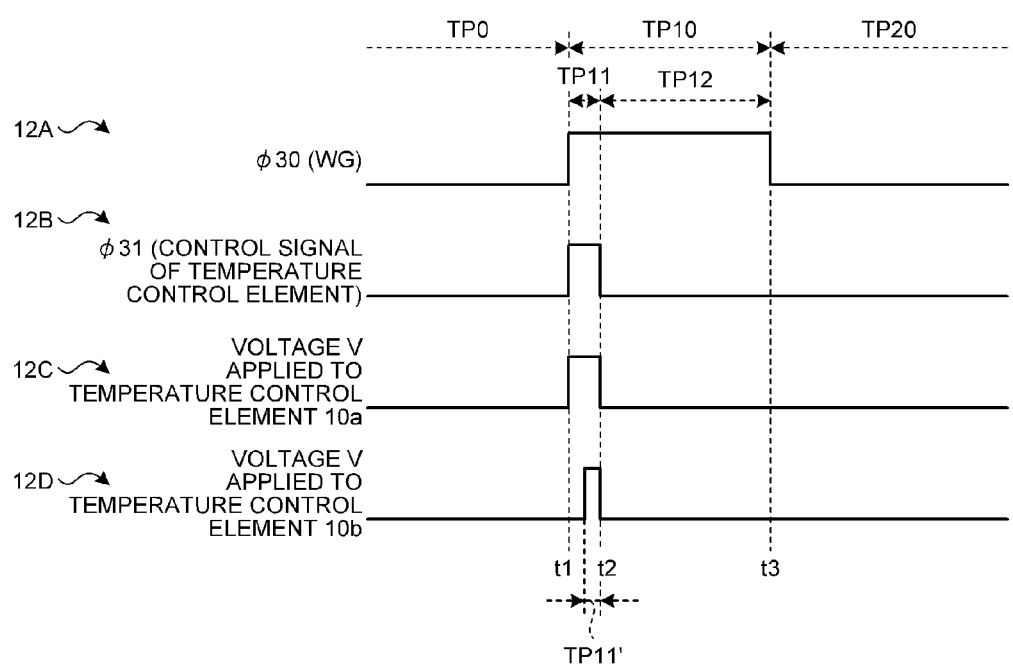
FIG. 11 is a flowchart illustrating read operation of magnetic head of the modification of the first embodiment.

Alternatively, as illustrated in 12C and 12D of FIG. 11, it is possible to apply a voltage V to the temperature control element 10b from the head control section 123 for the time length TP11' (<TP11), which is shorter than the period TP11, while applying a voltage V to the temperature control element 10a from the head control section 123 for the time length of the period TP11. At this time, the voltages V applied to both the temperature control elements 10a and 10b may be equal to each other. Meanwhile, 12A and 12B of FIG. 11 are the same as 6B and 6C of FIG. 5.

Alternatively, the control of the temperature of the wave guide 4 may be further performed when the operation of the magnetic head 110 is switched to a read operation from a write operation in addition to when the operation of the magnetic head 110 is switched to a write operation from a read operation.

Figure 12:
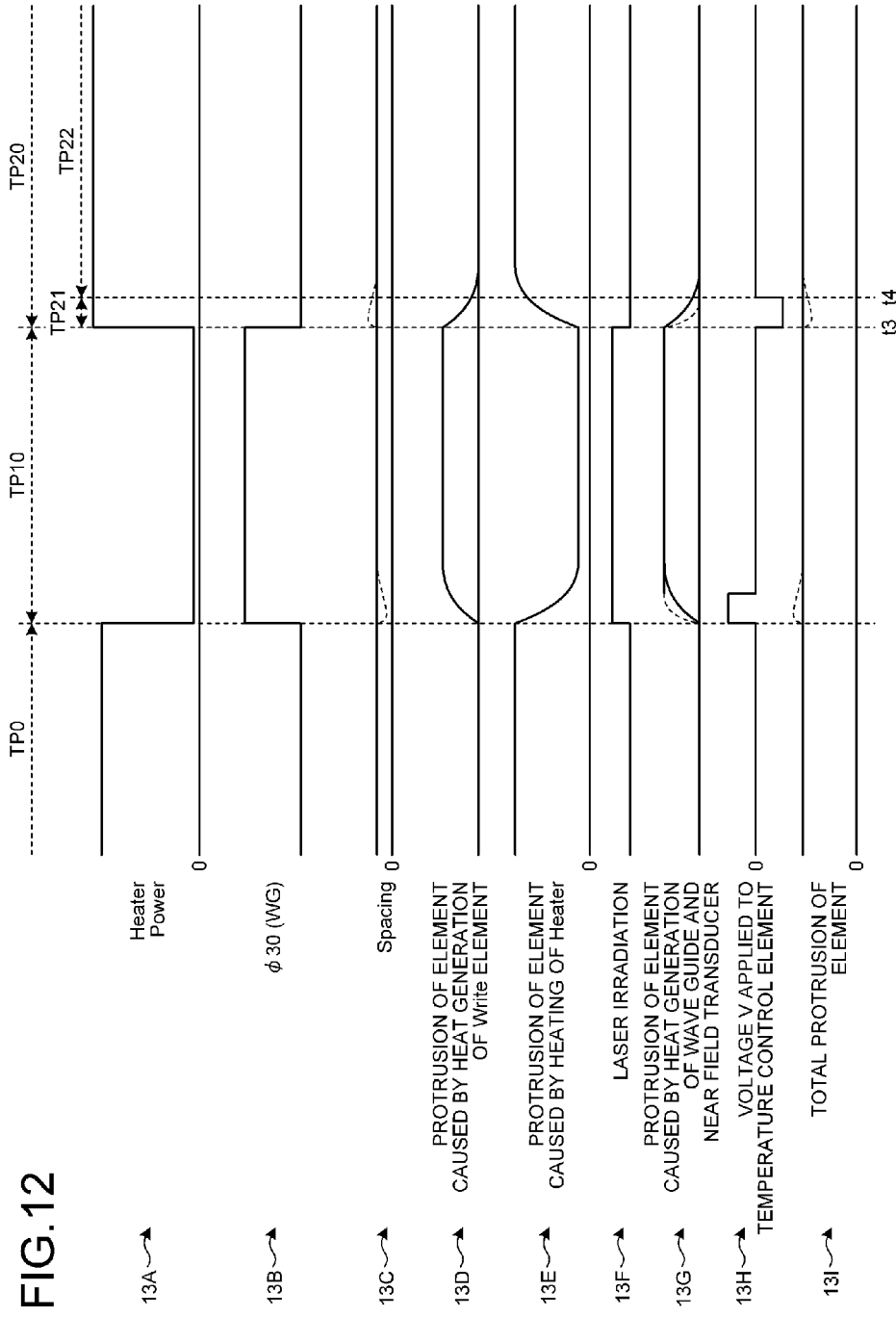
FIG. 12 is a diagram illustrating control timings of temperature control elements of another modification of the first embodiment.

As illustrated in FIG. 12, in a period TP21 between timings t3 and t4 in a read period TP20, the temperature control elements 10a and 10b control the temperature of the wave guide 4 as illustrated in 13H of FIG. 12. A voltage V is applied to the temperature control elements 10a and 10b, so that current in a direction opposite to the direction represented by the arrows of FIGS. 2 to 4 flows. With this operation, the temperature control element 10a can absorb the heat of the ambient atmosphere (for example, the air) through the heat sink 17a and the electrode 13a and supply the absorbed heat to the wave guide 4 through the electrodes 11a and 12a.

In this case, in the period TP21 in which the operation of the magnetic head 110 is switched to a read operation from a write operation, the magnetic record controller 120 of the magnetic disk drive 100 controls the temperature of the wave guide 4 guiding light to the near field transducer 5 of the magnetic head 110 and controls the magnetic head 110 so that the magnetic head 110 starts a read operation. In a period TP22 subsequent to the period TP21, the magnetic record controller 120 turns off the control of the temperature of the wave guide 4 of the magnetic head 110 and controls the magnetic head 110 so that the magnetic head 110 continues to perform a read operation. Accordingly, since it is possible to suppress the temporary increase of the protruding length of the near field transducer 5 when the operation of the magnetic head 110 is switched to a read operation from a write operation (see characteristics represented in 13C and 13I of FIG. 12 by broken lines), it is possible to easily maintain a spacing between the near field transducer 5 and the magnetic disk 50 constant (see characteristics represented in 13C and 13I of FIG. 12 by solid lines).

Figure 13:
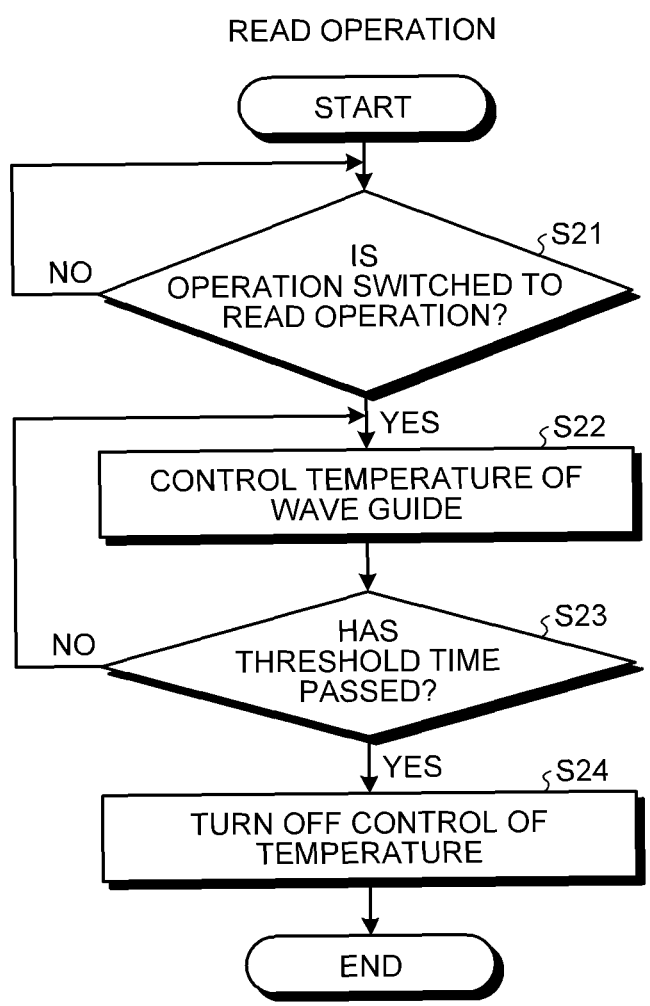
FIG. 13 is a flowchart illustrating read operation of magnetic head of another modification of the first embodiment.

Further, in this case, as illustrated in FIG. 13, the read operation of the magnetic head 110 is different from that of the first embodiment in terms of the followings. FIG. 13 is a flowchart illustrating the read operation of the magnetic head 110.

In Step S21, the hard disk control section 122 determines whether or not to switch the operation of the magnetic head 110 to a read operation.

When the hard disk control section 122 receives a read switching instruction for switching an operation to a read operation from the host HS (see FIG. 1), the hard disk control section 122 determines that the operation of the magnetic head 110 should be switched to a read operation. When the hard disk control section 122 does not receive a read switching instruction, the hard disk control section 122 determines that the operation of the magnetic head 110 should not be switched to a read operation.

If the hard disk control section 122 determines that the operation of the magnetic head 110 should be switched to a read operation (Yes in Step S21), a process proceeds to Step S22. If the hard disk control section 122 determines that the operation of the magnetic head 110 should not be switched to a read operation (No in Step S21), the process returns to Step S21.

In Step S22, the hard disk control section 122 supplies a control signal $\phi 31$, which corresponds to a second active level (for example, −H level), to the head control section 123 through the line 31 and starts a count operation of a timer (not illustrated). Accordingly, the head control section 123 adjusts the applied voltage V to a second ON-level and supplies the voltage to the temperature control elements 10a and 10b. That is, the head control section 123 starts the control of the temperature of the wave guide 4 that is performed by the temperature control elements 10a and 10b.

Further, the hard disk control section 122 supplies a WG signal $\phi 30$, which corresponds to a non-active level (for example, L level), to the head control section 123 through the line 30. Accordingly, the head control section 123 controls the magnetic head 110 so that the magnetic head 110 starts a read operation.

In Step S23, the hard disk control section 122 determines whether or not threshold time Tth2 has passed from the start of the control of the temperature of the wave guide 4. If counted time is equal to or longer than the threshold time Tth2, the hard disk control section 122 determines that the threshold time Tth2 has passed with reference to time counted by the time. If counted time is shorter than the threshold time Tth2, the hard disk control section 122 determines that the threshold time Tth2 does not have passed. Meanwhile, the threshold time Tth2 corresponds to the length of the period TP21 (see FIG. 12), and is time that is obtained by subtracting the response time of a switching operation from the length of the period TP21.

If the hard disk control section 122 determines that the threshold time Tth2 has passed (Yes in Step S23), the process proceeds to Step S24. If the hard disk control section 122 determines that the threshold time Tth2 does not have passed (No in Step S23), the process returns to Step S22.

In Step S24, the hard disk control section 122 supplies a control signal $\phi 31$, which corresponds to a non-active level, to the head control section 123 through the line 31. Accordingly, the head control section 123 adjusts the applied voltage V to an OFF-level and supplies the voltage to the temperature control elements 10a and 10b. That is, the head control section 123 turns off the control of the temperature of the wave guide 4 that is performed by the temperature control elements 10a and 10b.

Furthermore, the hard disk control section 122 supplies a WG signal φ30, which corresponds to a non-active level, to the head control section 123 through the line 30. Accordingly, the head control section 123 controls the magnetic head 110 so that the magnetic head 110 continues to perform a read operation.

As described above, when the operation of the magnetic head 110 is switched to a read operation from a write operation, the magnetic record controller of the magnetic disk drive 100 controls the temperature of the wave guide 4 guiding light to the near field transducer 5 of the magnetic head 110 and controls the magnetic head 110 so that the magnetic head 110 starts a read operation. Further, after the read operation of the magnetic head 110 is started and the threshold time (second threshold time) Tth2 has passed, the magnetic record controller turns off the control of the temperature of the wave guide 4 of the magnetic head 110 and controls the magnetic head 110 so that the magnetic head 110 continues to perform a read operation. Accordingly, since it is possible to suppress the temporary increase of the protruding length of the near field transducer 5 when the operation of the magnetic head 110 is switched to a read operation from a write operation, it is possible to easily maintain a spacing between the near field transducer 5 and the magnetic disk 50 constant. Therefore, it is possible to improve the accuracy of a read operation, so that it is possible to further improve the reliability of the magnetic disk drive 100.

Figure 14:
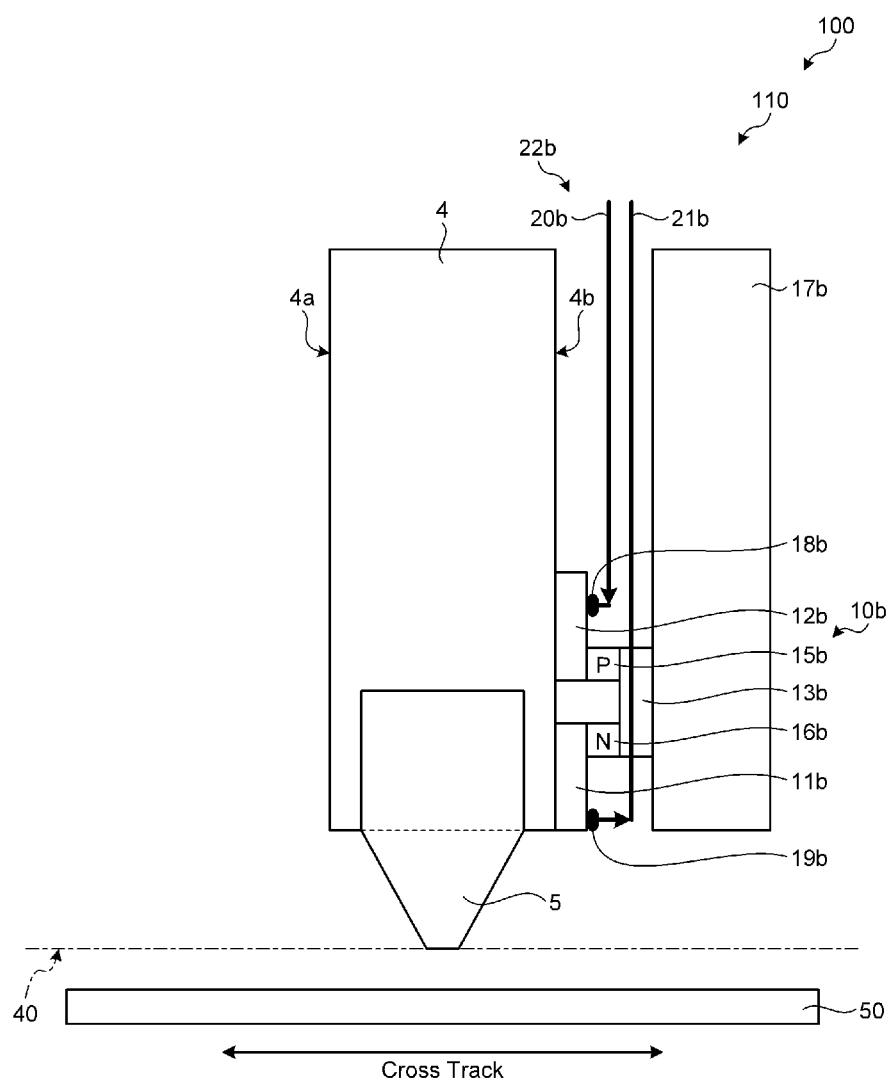
FIG. 14 is a cross-sectional view of the magnetic head of another modification of the first embodiment taken in the cross-track direction.

Alternatively, in the magnetic head 110, the temperature control element may be provided on one side surface of the wave guide 4. As illustrated in FIG. 14, in the magnetic head 110, the temperature control element 10a (see FIG. 4) may not be provided on the side surface 4a of the wave guide 4 and the temperature control element 10b may be provided on the opposite side surface 4b of the wave guide 4. Alternatively, conversely, in the magnetic head 110, the temperature control element 10b (see FIG. 4) may not be provided on the side surface 4b of the wave guide 4 and the temperature control element 10a may be provided on the opposite side surface 4a of the wave guide 4.

Second Embodiment

Next, a magnetic disk drive 200 according to a second embodiment will be described. Portions different from the first embodiment will be mainly described below.

Figure 15:
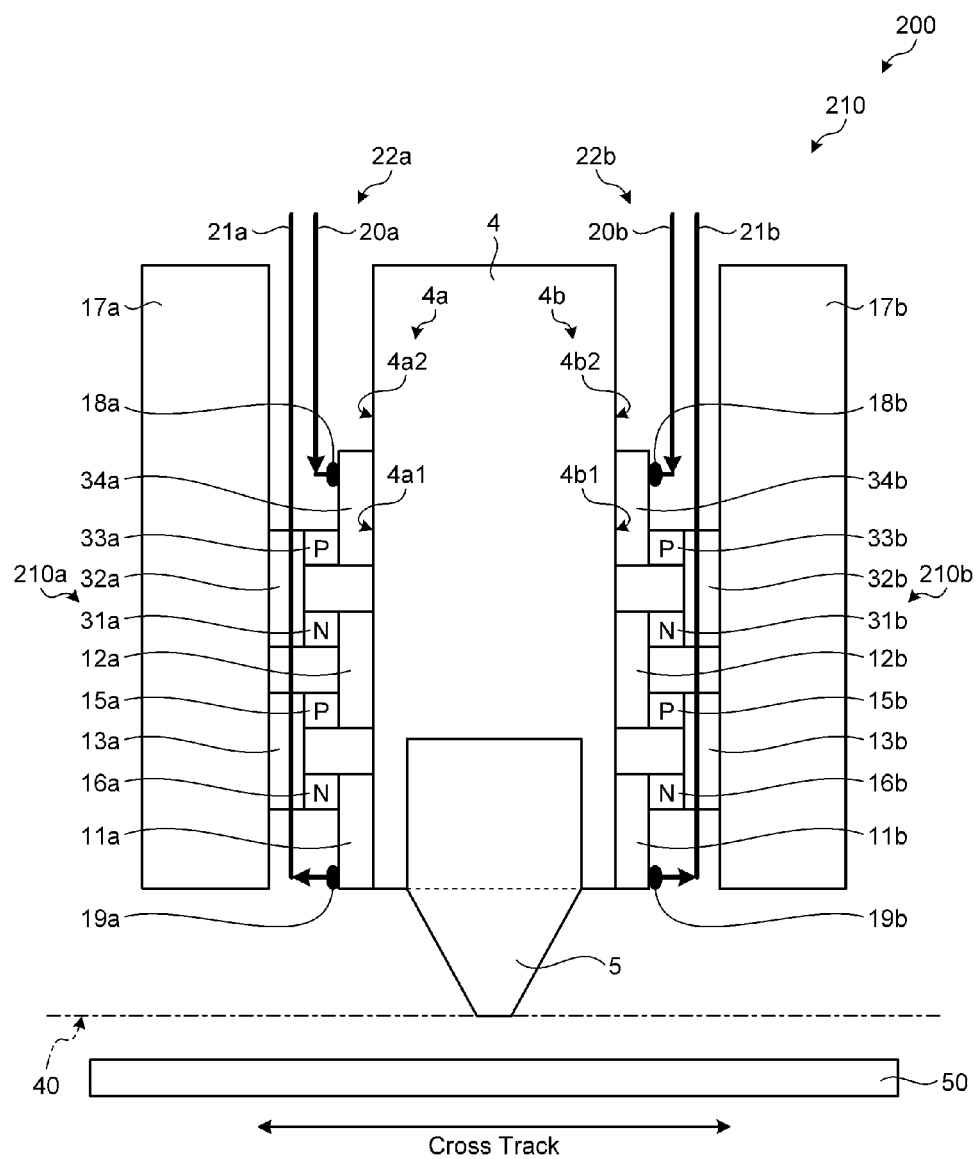
FIG. 15 is a cross-sectional view of a magnetic head of a second embodiment taken in the cross-track direction.

The magnetic disk drive 200 includes a magnetic head 210 illustrated in FIG. 15, instead of the magnetic head 110 (see FIGS. 2 to 4). FIG. 15 is a cross-sectional view of the magnetic head 210 taken in a cross-track direction. The magnetic head 210 includes temperature control elements 210a and 210b instead of the temperature control elements 10a and 10b (see FIGS. 2 to 4).

Specifically, the temperature control element 210a further includes an electrode 34a, an electrode 32a, a semiconductor 31a, and a semiconductor 33a.

The electrode 34a is disposed in contact with the region 4a1 of the side surface 4a of the wave guide 4 so as to be separated from the electrode 12a. The electrode 34a is positioned more distant from the ABS surface 40 than the electrode 12a so as to be separated from the electrode 12a along the side surface 4a. The electrode 34a extends along the side surface 4a. The electrode 34a is made of a conductor such as metal. The electrode 34a is electrically and thermally connected to the electrode 32a through the semiconductor 33a. An end portion of the electrode 34a close to the ABS surface 40 is electrically and thermally connected to the electrode 32a through the semiconductor 33a.

The electrode 32a is disposed on the side of the electrodes 12a and 34a. The electrode 32a is disposed on the side of the electrodes 12a and 34a so as to face the electrodes 12a and 34a. The electrode 32a extends in parallel with the side surface 4a. The electrode 32a is disposed at a position corresponding to a space between the electrodes 12a and 34a in a direction perpendicular to the ABS surface 40. The electrode 32a is made of a conductor such as metal. The electrode 32a is electrically and thermally connected to the electrode 12a through the semiconductor 31a, and is electrically and thermally connected to the electrode 34a through the semiconductor 33a. An end portion of the electrode 32a close to the ABS surface 40 is electrically and thermally connected to the electrode 12a through the semiconductor 31a, and an end portion of the electrode 32a distant from the ABS surface 40 is electrically and thermally connected to the electrode 34a through the semiconductor 33a.

The semiconductor 31a is disposed between the electrodes 12a and 32a. The semiconductor 31a contains a first conductivity type (for example, N-type) impurity (for example, phosphorus, arsenic, or the like). The semiconductor 31a is a semiconductor that contains the first conductivity type impurity, and is a semiconductor such as silicon. The semiconductor 31a is interposed between the electrodes 12a and 32a. One end of the semiconductor 31a is disposed in contact with the electrode 12a, and the other end thereof is disposed in contact with the electrode 32a. When been seen through in the direction perpendicular to the side surface 4a, the semiconductor 31a is disposed between the electrodes 12a and 32a so as to be included in a region where the electrodes 12a and 32a overlap each other.

The semiconductor 33a is disposed between the electrodes 34a and 32a. The semiconductor 33a contains a second conductivity type (for example, P-type) impurity (for example, boron, aluminum, or the like). The second conductivity type is a conductivity type opposite to the first conductivity type. The semiconductor 33a is a semiconductor that contains the second conductivity type impurity, and is a semiconductor such as silicon. The semiconductor 33a is interposed between the electrodes 34a and 32a. One end of the semiconductor 33a is disposed in contact with the electrode 34a, and the other end thereof is disposed in contact with the electrode 32a. When been seen through in the direction perpendicular to the side surface 4a, the semiconductor 33a is disposed between the electrodes 34a and 32a so as to be included in a region where the electrodes 34a and 32a overlap each other.

The heat sink 17a is disposed in contact with the electrodes 13a and 32a. The heat sink 17a is thermally connected to the electrodes 13a and 32a. Accordingly, the heat sink 17a can dissipate the heat of the electrodes 13a and 32a to the ambient atmosphere (for example, the air).

The wiring 22a is configured so that current flows between the electrodes 11a and 34a. The line 20a is electrically connected to the electrode 34a through the terminal 18a. The line 21a is electrically connected to the electrode 11a through the terminal 19a. Current, which corresponds to an applied voltage V, is supplied to the terminals 18a and 19a from the head control section 123 through the lines 20a and 21a.

When the first conductivity type is an N-type and the second conductivity type is a P-type in the wiring 22a and current flows in a direction represented by arrows of FIG. 15, the vicinity of an interface between the electrode 11a and the semiconductor 16a, the vicinity of an interface between the electrode 12a and the semiconductor 15a, the vicinity of an interface between the electrode 12a and the semiconductor 31a, and the vicinity of an interface between the electrode 34a and the semiconductor 33a act as a heat absorbing surface. The vicinity of an interface between the electrode 13a and the semiconductor 16a, the vicinity of an interface between the electrode 13a and the semiconductor 15a, the vicinity of an interface between the electrode 32a and the semiconductor 31a, and the vicinity of an interface between the electrode 32a and the semiconductor 33a act as a heat generating surface. That is, when current flows through the wiring 22a in the direction represented by the arrows of FIG. 15, the temperature control element 210a can absorb the heat of the wave guide 4 through the electrodes 11a, 12a, and 34a and dissipate the absorbed heat to the ambient atmosphere (for example, the air) through the electrodes 13a and 13b and the heat sink 17a. Meanwhile, when the first conductivity type is a P-type and the second conductivity type is an N-type, it is possible to operate the temperature control element 210a in the same manner by making current flow in a direction opposite to the direction represented by the arrows of FIG. 15.

Further, when the first conductivity type is an N-type and the second conductivity type is a P-type in the wiring 22a and current flows in a direction opposite to the direction represented by the arrows of FIG. 15, the vicinity of an interface between the electrode 11a and the semiconductor 16a, the vicinity of an interface between the electrode 12a and the semiconductor 15a, the vicinity of an interface between the electrode 12a and the semiconductor 31a, and the vicinity of an interface between the electrode 34a and the semiconductor 33a act as a heat generating surface. The vicinity of an interface between the electrode 13a and the semiconductor 16a, the vicinity of an interface between the electrode 13a and the semiconductor 15a, the vicinity of an interface between the electrode 32a and the semiconductor 31a, and the vicinity of an interface between the electrode 32a and the semiconductor 33a act as a heat absorbing surface. That is, when current flows through the wiring 22a in a direction opposite to the direction represented by the arrows of FIG. 15, the temperature control element 210a can absorb the heat of the ambient atmosphere (for example, the air) through the heat sink 17a and the electrodes 13a and 32a and supply the absorbed heat to the wave guide 4 through the electrodes 11a, 12a, and 34a. Meanwhile, when the first conductivity type is a P-type and the second conductivity type is an N-type, it is possible to operate the temperature control element 210a in the same manner by making current flow in the direction represented by the arrows of FIG. 15.

Likewise, the temperature control element 210b further includes an electrode 34b, an electrode 32b, a semiconductor 31b, and a semiconductor 33b. Meanwhile, when an index "a" is substituted with an index "b", the description of each portion of the temperature control element 210a also can be applied to each portion of the temperature control element 210b alike.

As described above, in the second embodiment, the temperature control element (first temperature control element) 210a of the magnetic head 210 further includes the electrode 34a, the electrode 32a, the semiconductor 31a, and the semiconductor 33a. Accordingly, since it is possible to form a plurality of heat dissipation paths in parallel, it is possible to more efficiently control the temperature of the wave guide 4.

Likewise, the temperature control element (second temperature control element) 210b of the magnetic head 210 further includes the electrode 34b, the electrode 32b, the semiconductor 31b, and the semiconductor 33b. Accordingly, since it is possible to form a plurality of heat dissipation paths in parallel on both sides of the wave guide 4, it is possible to more efficiently control the temperature of the wave guide 4.

Figure 16:
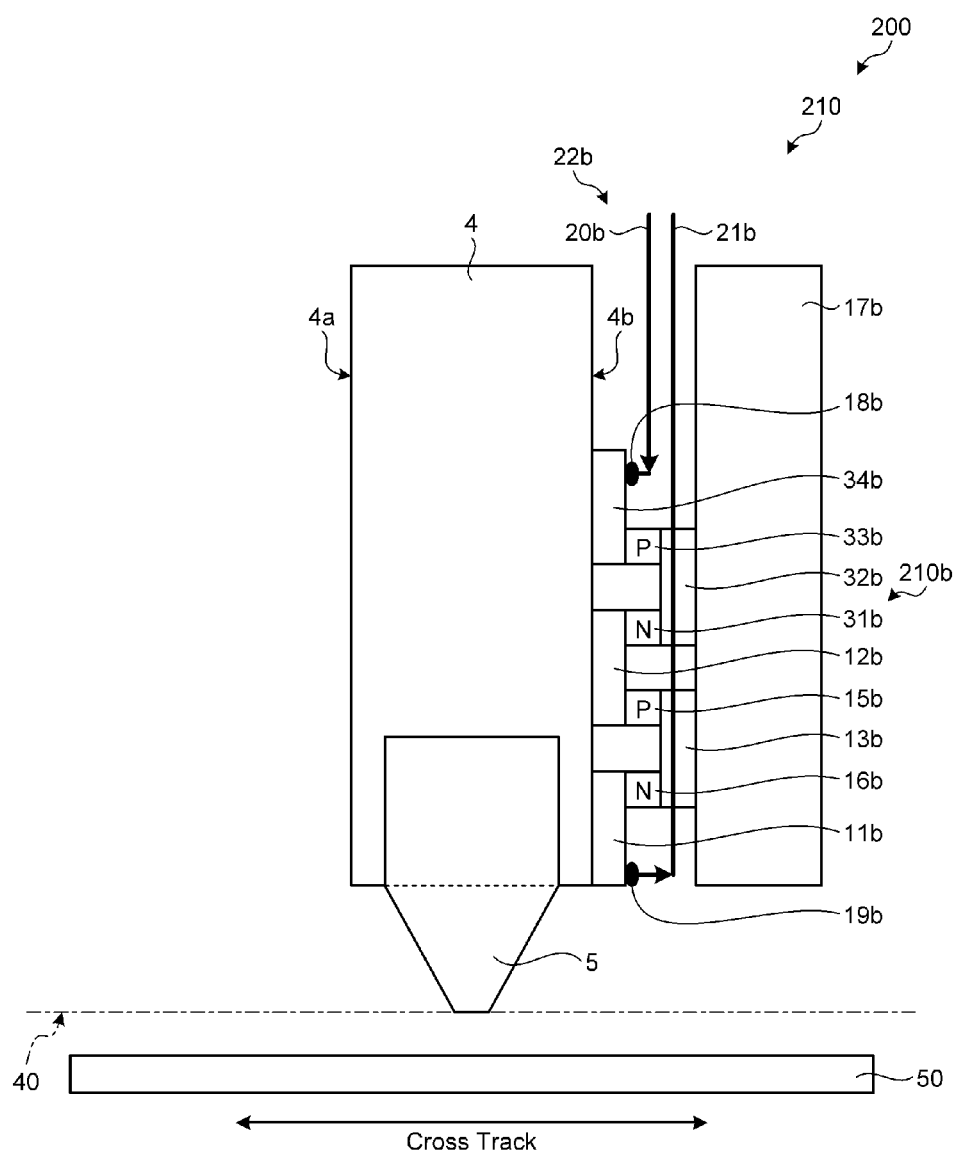
FIG. 16 is a cross-sectional view of a magnetic head of a modification of the second embodiment taken in the cross-track direction.

Meanwhile, in the magnetic head 210, the temperature control element may be provided on one side surface of the wave guide 4. As illustrated in FIG. 16, in the magnetic head 210, the temperature control element 210a (see FIG. 15) may not be provided on the side surface 4a of the wave guide 4 and the temperature control element 210b may be provided on the opposite side surface 4b of the wave guide 4. Alternatively, conversely, in the magnetic head 210, the temperature control element 210b (see FIG. 15) may not be provided on the side surface 4b of the wave guide 4 and the temperature control element 210a may be provided on the opposite side surface 4a of the wave guide 4.

Third Embodiment

Next, a magnetic disk drive 300 according to a third embodiment will be described. Portions different from the first embodiment will be mainly described below.

Figure 17:
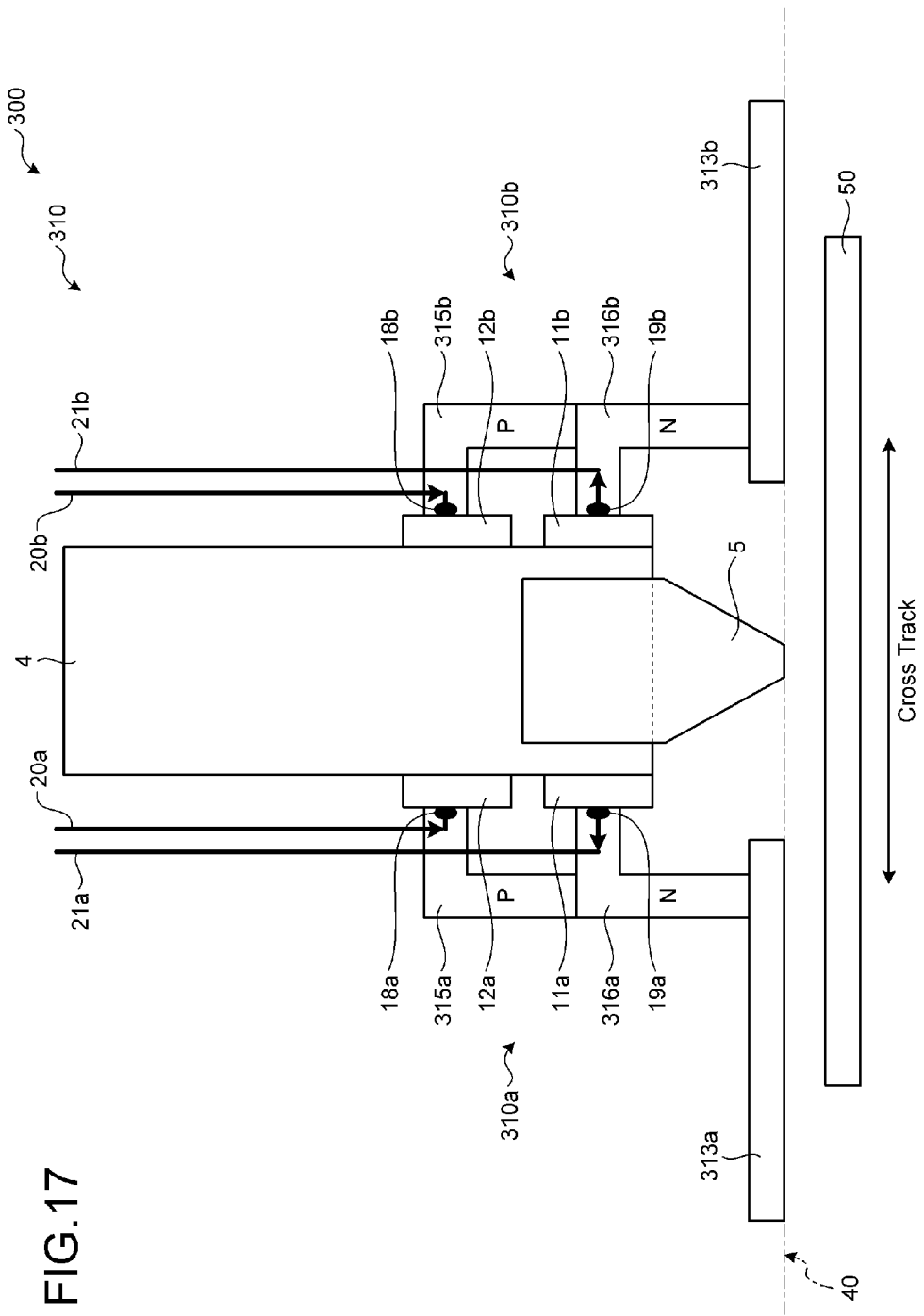
FIG. 17 is a cross-sectional view of a magnetic head of a third embodiment taken in the cross-track direction.
Figure 18:
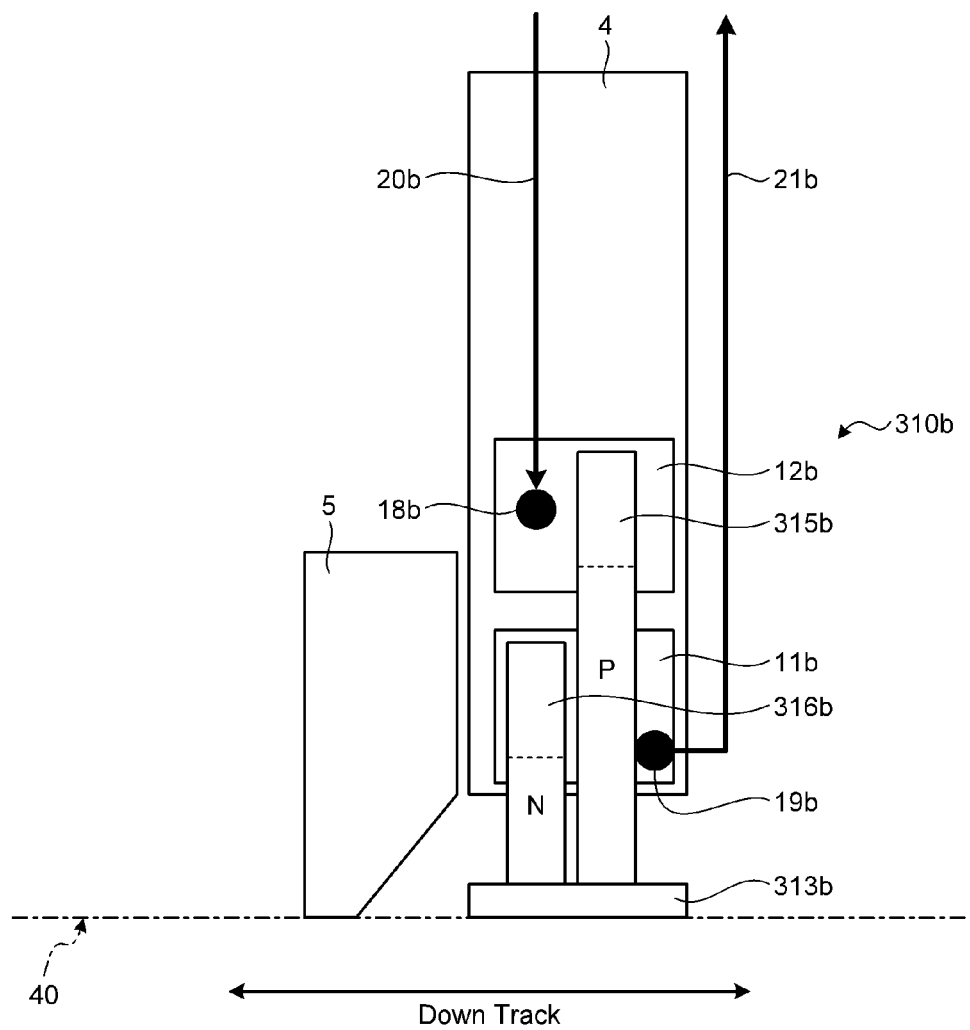
FIG. 18 is an enlarged cross-sectional view of the magnetic head of the third embodiment taken in the down-track direction.

The magnetic disk drive 300 includes a magnetic head 310 illustrated in FIGS. 17 and 18, instead of the magnetic head 110 (see FIGS. 2 to 4). FIG. 17 is a cross-sectional view of the magnetic head 310 taken in a cross-track direction. FIG. 18 is a cross-sectional view of the magnetic head 310 taken in a down-track direction. The magnetic head 310 includes temperature control elements 310a and 310b instead of the temperature control elements 10a and 10b (see FIGS. 2 to 4).

Specifically, the temperature control element 310a includes an electrode 313a, a semiconductor 316a, and a semiconductor 315a instead of the electrode 13a, the semiconductor 16a, and the semiconductor 15a (see FIG. 4), and does not include the heat sink 17a (see FIG. 4).

The electrode 313a is disposed on the ABS surface 40. The electrode 313a extends along the ABS surface 40. The electrode 313a is disposed at a position, which is more distant from the near field transducer 5 than the electrodes 11a and 12a, in a direction parallel to the ABS surface 40 (a direction perpendicular to the side surface 4a). An end portion of the electrode 313a close to the wave guide 4 is electrically and thermally connected to the electrode 11a through the semiconductor 316a, and is electrically and thermally connected to the electrode 12a through the semiconductor 315a.

The semiconductor 316a extends from the electrode 11a so as to be connected to the electrode 313a. The semiconductor 316a is bent and extends so that one end of the semiconductor 316a is connected to the electrode 11a and the other end thereof is connected to the electrode 313a.

The semiconductor 315a extends from the electrode 12a so as to be connected to the electrode 313a. The semiconductor 315a is bent and extends so that one end of the semiconductor 315a is connected to the electrode 12a and the other end thereof is connected to the electrode 313a.

Likewise, the temperature control element 310b includes an electrode 313b, a semiconductor 316b, and a semiconductor 315b instead of the electrode 13b, the semiconductor 16b, and the semiconductor 15b (see FIG. 4), and does not include the heat sink 17b. Meanwhile, when an index "a" is substituted with an index "b", the description of each portion of the temperature control element 310a also can be applied to each portion of the temperature control element 310b alike.

As described above, in the third embodiment, the temperature control element (first temperature control element) 310a of the magnetic head 310 includes the electrode 313a, the semiconductor 316a, and the semiconductor 315a and does not include the heat sink 17a (see FIG. 4). The electrode (third electrode) 313a is disposed on the ABS surface 40, and extends along the ABS surface 40. The semiconductor (first semiconductor) 316*a* extends from the electrode 11*a* so as to be connected to the electrode 313*a*. The semiconductor (second semiconductor) 315*a* extends from the electrode 12*a* so as to be connected to the electrode 313*a*. Accordingly, it is possible to make the electrode 313*a* function as a heat sink and to position a heat dissipation surface on the ABS surface 40. As a result, it is possible to efficiently dissipate heat from the electrode 313*a* by using the flow of air that flows near the ABS surface 40.

Meanwhile, in the magnetic head 310, the temperature control element may be provided on one side surface of the wave guide 4. As illustrated in FIG. 19, in the magnetic head 310, the temperature control element 310*a* (see FIG. 17) may not be provided on the side surface 4*a* of the wave guide 4 and the temperature control element 310*b* may be provided on the opposite side surface 4*b* of the wave guide 4. Alternatively, conversely, in the magnetic head 310, the temperature control element 310*b* (see FIG. 17) may not be provided on the side surface 4*b* of the wave guide 4 and the temperature control element 310*a* may be provided on the opposite side surface 4*a* of the wave guide 4.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic head comprising:
   a wave guide;
   a near field transducer disposed on an ABS surface and to which light is guided from the wave guide;
   a writing magnetic pole disposed on the ABS surface;
   a magnetic core connected to the writing magnetic pole so as to generate a magnetic field from a portion of the writing magnetic pole close to the ABS surface;
   a writing coil disposed so as to go around the magnetic core; and
   a first temperature control element disposed in contact with a region of a first side surface of the wave guide near the near field transducer,
   wherein the first temperature control element comprises
   a first electrode disposed in contact with the first side surface of the wave guide,
   a second electrode disposed in contact with the first side surface of the wave guide so as to be separated from the first electrode,
   a third electrode disposed on a side of the first and second electrodes,
   a first semiconductor of a first conductivity type and disposed between the first and third electrodes,
   a second semiconductor of a second conductivity type and disposed between the second and third electrodes, and
   a first wiring allowing current to flow between the first and second electrodes.

2. The magnetic head of claim 1,
   wherein the first conductivity type is a conductivity type opposite to the second conductivity type.

3. The magnetic head of claim 1,
   wherein the third electrode extends substantially in parallel with the first side surface of the wave guide, and
   the first temperature control element further includes a first heat sink disposed in contact with the third electrode.

4. The magnetic head of claim 3,
   wherein the first heat sink protrudes in a direction substantially perpendicular to the first side surface of the wave guide, and extends substantially in parallel with the first side surface of the wave guide.

5. The magnetic head of claim 1,
   wherein the first temperature control element further comprises a fourth electrode disposed in contact with the first side surface of the wave guide so as to be separated from the second electrode,
   a fifth electrode disposed on a side of the second and fourth electrodes,
   a third semiconductor of the first conductivity type and disposed between the second and fifth electrodes, and
   a fourth semiconductor of the second conductivity type and disposed between the fourth and fifth electrodes, and
   wherein the first wiring allows current to flow between the first and fourth electrodes.

6. The magnetic head of claim 1,
   wherein the third electrode is disposed on the ABS surface and extends along the ABS surface,
   the first semiconductor extends from the first electrode so as to be connected to the third electrode, and
   the second semiconductor extends from the second electrode so as to be connected to the third electrode.

7. The magnetic head of claim 1, further comprising:
   a second temperature control element disposed in contact with a region of a second side surface of the wave guide near the near field transducer.

8. The magnetic head of claim 7,
   wherein the second temperature control element comprises
   a sixth electrode disposed in contact with the second side surface of the wave guide,
   a seventh electrode disposed in contact with the second side surface of the wave guide so as to be separated from the sixth electrode,
   an eighth electrode disposed on a side of the sixth and seventh electrodes,
   a fifth semiconductor of the first conductivity type and disposed between the sixth and eighth electrodes,
   a sixth semiconductor of the second conductivity type and disposed between the seventh and eighth electrodes, and
   a second wiring allowing current to flow between the sixth and seventh electrodes.

9. The magnetic head of claim 8,
   wherein the eighth electrode extends along the second side surface of the wave guide, and
   the second temperature control element further comprises a second heat sink disposed in contact with the eighth electrode.

10. The magnetic head of claim 8,
    wherein the second temperature control element further comprises
    a ninth electrode disposed in contact with the second side surface of the wave guide so as to be separated from the seventh electrode,
    a tenth electrode disposed on a side of the seventh and ninth electrodes,
    a seventh semiconductor of the first conductivity type and disposed between the seventh and tenth electrodes, and
    an eighth semiconductor of the second conductivity type and disposed between the ninth and tenth electrodes, and
    wherein the second wiring allows current to flow between the sixth and ninth electrodes.

11. The magnetic head of claim 8,
wherein the eighth electrode is disposed on the ABS surface and extends along the ABS surface,
the fifth semiconductor extends from the sixth electrode so as to be connected to the eighth electrode, and
the sixth semiconductor extends from the seventh electrode so as to be connected to the eighth electrode.

12. A magnetic disk drive comprising:
the magnetic head of claim 1; and
a controller controlling a read operation and a write operation by the magnetic head.

13. The magnetic disk drive of claim 12,
wherein the first conductivity type is a conductivity type opposite to the second conductivity type.

14. The magnetic disk drive of claim 12,
wherein the third electrode extends substantially in parallel with the first side surface of the wave guide, and
the first temperature control element further includes a first heat sink disposed in contact with the third electrode.

15. The magnetic disk drive of claim 12,
wherein the magnetic head further comprises a second temperature control element disposed in contact with a region of a second side surface of the wave guide near the near field transducer.

16. The magnetic disk drive of claim 15, wherein
the first and second temperature control elements control the temperature of the wave guide so as to be synchronized with each other.

17. The magnetic disk drive of claim 15, wherein
the first and second temperature control elements control the temperature of the wave guide independently of each other.

18. A magnetic disk drive comprising:
a magnetic head; and
a controller controlling a read operation and a write operation by the magnetic head,
wherein the magnetic head comprises
a wave guide;
a near field transducer disposed on an ABS surface and to which light is guided from the wave guide;
a writing magnetic pole disposed on the ABS surface;
a magnetic core connected to the writing magnetic pole so as to generate a magnetic field from a portion of the writing magnetic pole close to the ABS surface;
a writing coil disposed so as to go around the magnetic core; and
a first temperature control element disposed in contact with a region of a first side surface of the wave guide near the near field transducer; and
a second temperature control element disposed in contact with a region of a second side surface of the wave guide near the near field transducer, and
wherein the first and second temperature control elements control the temperature of the wave guide independently of each other.

* * * * *